United States Patent
Marshall

(10) Patent No.: US 8,882,058 B2
(45) Date of Patent: Nov. 11, 2014

(54) SEWER-HOSE-SUPPORTING-AND-PROTECTING SYSTEM HAVING QUICK-RELEASE STAKE-CLAMPING SCREWS, QUICK-RELEASE JAW-SQUEEZING NUTS, MULTI-PURPOSE TWO-WAY STAKES, AND SEQUENTIAL-LOCKING JOINTS

(76) Inventor: Dennis Marshall, Fairview, OR (US)

( * ) Notice: Subject to any disclaimer, the term of this patent is extended or adjusted under 35 U.S.C. 154(b) by 355 days.

(21) Appl. No.: 13/466,032

(22) Filed: May 7, 2012

(65) Prior Publication Data

US 2012/0292462 A1    Nov. 22, 2012

Related U.S. Application Data

(60) Provisional application No. 61/519,116, filed on May 17, 2011.

(51) Int. Cl.
*F16L 3/10* (2006.01)
*F16L 3/20* (2006.01)

(52) U.S. Cl.
CPC ........................................ *F16L 3/20* (2013.01)
USPC .............. 248/74.2; 248/62; 248/74.4; 248/87

(58) Field of Classification Search
USPC ......... 248/49, 58, 62, 65, 74.1, 74.2, 74.4, 87
See application file for complete search history.

(56) References Cited

U.S. PATENT DOCUMENTS

| 4,715,570 | A | 12/1987 | Mashuda |
| 4,722,500 | A | 2/1988 | Bray |
| 4,804,158 | A * | 2/1989 | Collins et al. ................ 248/74.4 |
| 4,905,939 | A | 3/1990 | Horn |
| 5,067,679 | A | 11/1991 | Courtney |
| 5,431,455 | A * | 7/1995 | Seely .............................. 285/61 |
| 5,788,193 | A | 8/1998 | Hilbert |
| 6,003,819 | A | 12/1999 | Hall |
| 6,186,449 | B1 | 2/2001 | Chrestenson |
| 6,250,847 | B1 | 6/2001 | Bingham, Jr. |
| 6,619,596 | B1 | 9/2003 | Caine |
| 6,877,700 | B2 | 4/2005 | Smith |
| 6,892,990 | B2 * | 5/2005 | Pisczak ........................ 248/74.4 |
| 7,425,028 | B1 | 9/2008 | Angel |
| 7,434,771 | B1 | 10/2008 | Tai |
| 7,472,870 | B2 * | 1/2009 | Zagorski et al. ................ 248/65 |
| 2011/0309207 | A1 * | 12/2011 | Senkpiel ........................ 248/70 |

* cited by examiner

*Primary Examiner* — William Gilbert

(57) ABSTRACT

A quick-lock-and-quick-release system, using predetermined clamping and releasing methods to be assembled, disassembled, and adjusted for supporting and protecting a recreational-vehicle sewer hose, comprises a first semi-circular sequential-locking end joint, a second semi-circular sequential-locking end joint, semi-circular sequential-locking middle joints, quick-lock-and-quick-release stake-clamping jaw screws, quick-lock-and-quick-release jaw-squeezing chamber nuts, square-cross-section multi-purpose two-way stakes, and semi-circular sequential-locking pipes. The quick-lock-and-quick-release system eliminates permanent frictional forces between the multi-purpose two-way stakes and quick-lock-and-quick-release jaw-squeezing chamber nuts: a) To allow quick and easy assembly of the system, b) To allow quick and easy disassembly of the system, c) To allow the two-way stakes to be used right side up or upside down, and d) To eliminate personal injuries caused by the two-way stakes when they become rusted.

20 Claims, 22 Drawing Sheets

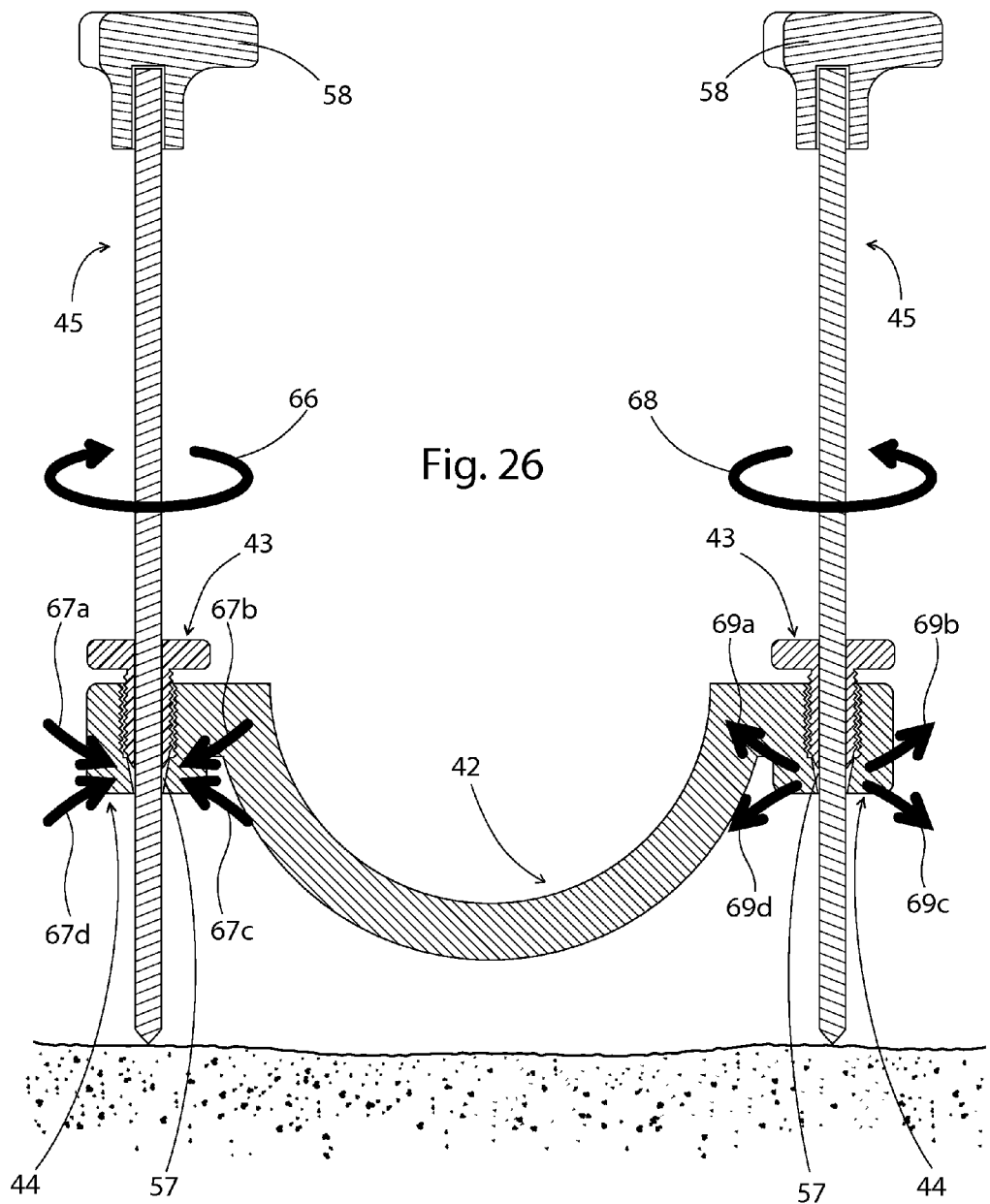

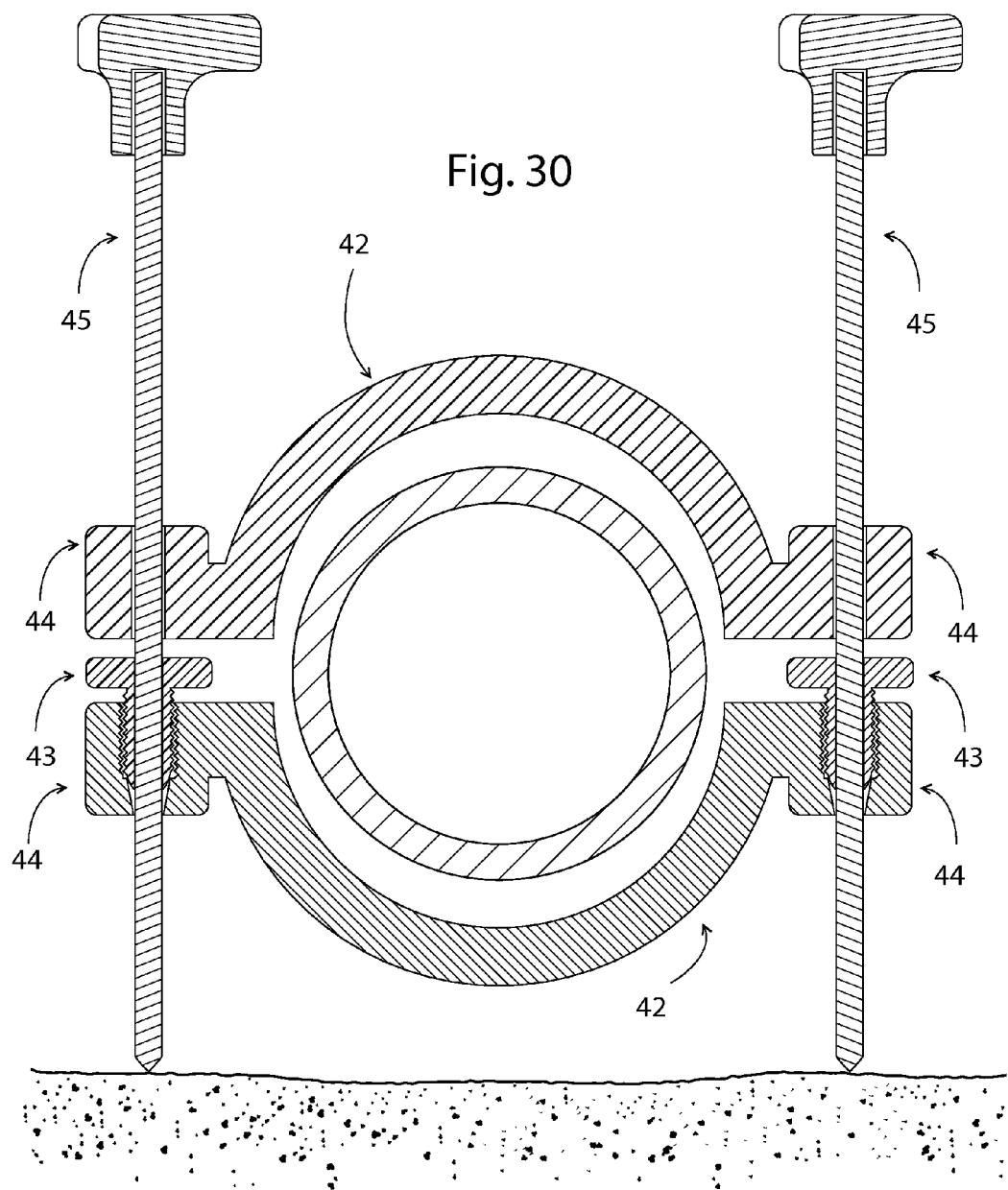

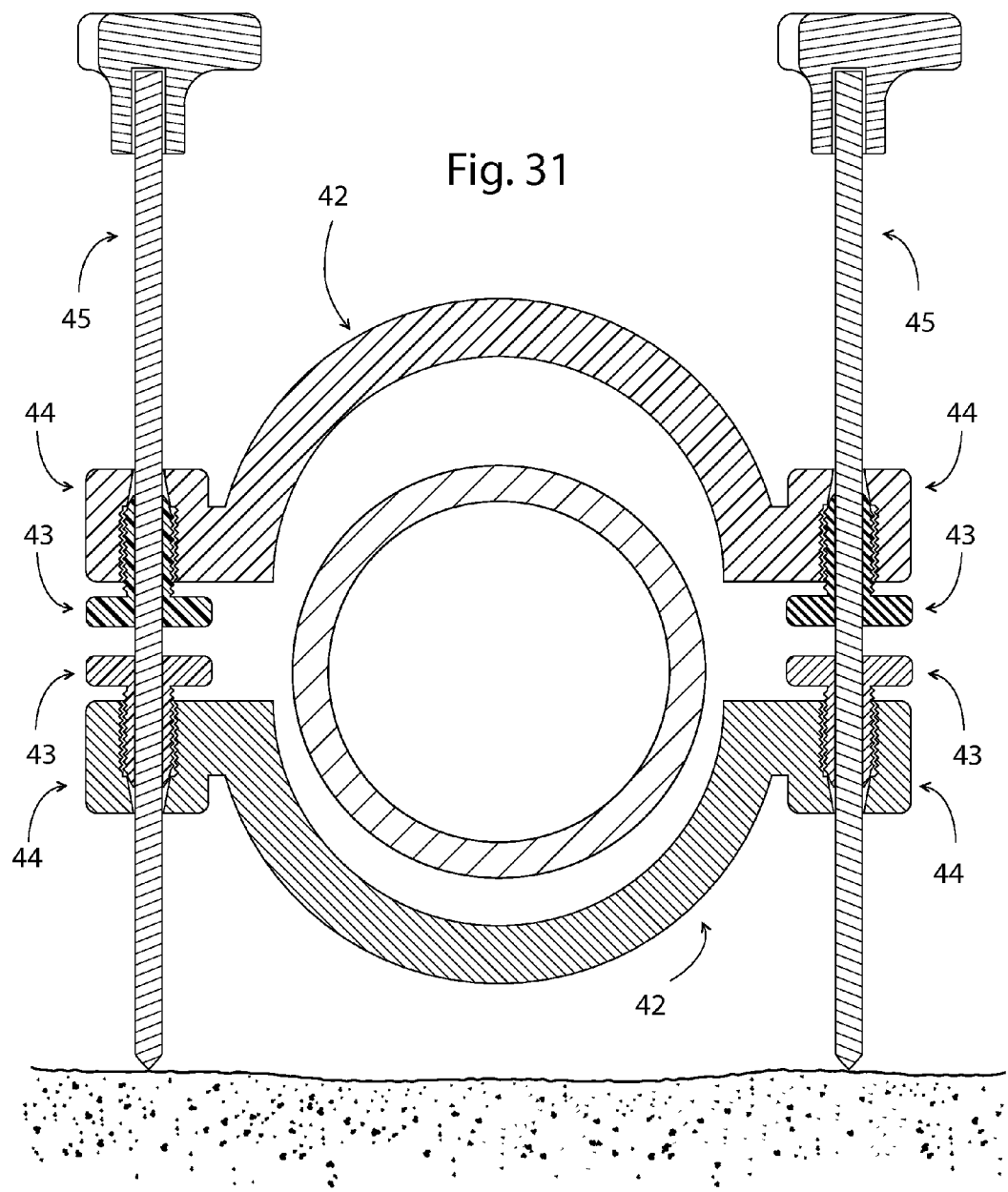

US 8,882,058 B2

SEWER-HOSE-SUPPORTING-AND-PROTECTING SYSTEM HAVING QUICK-RELEASE STAKE-CLAMPING SCREWS, QUICK-RELEASE JAW-SQUEEZING NUTS, MULTI-PURPOSE TWO-WAY STAKES, AND SEQUENTIAL-LOCKING JOINTS

REFERENCE TO PREVIOUSLY FILED PROVISIONAL PATENT APPLICATION

Provisional Patent Application No. 61/519,116 was filed on May 17, 2011.

1. FIELD OF THE INVENTION

The present invention relates to a unique supporting and protecting system for a recreational-vehicle sewer hose. Particularity, the present invention relates to a unique sewer-hose-supporting-and-protecting system having quick-lock-and-quick-release stake-clamping jaws, quick-lock-and-quick-release jaw-squeezing chambers, multi-purpose two-way stakes, and sequential-locking joints. The unique sewer-hose-supporting-and-protecting system is quick, easy, convenient, and safe to assemble, adjust, and disassemble for quickly locking, quickly releasing, supporting, and protecting a recreational-vehicle sewer hose, in a desired shape and at a desired height and angle, to overcome all the disadvantages of prior art.

2. DESCRIPTION OF THE PRIOR ART

A number of inventions for supporting and/or protecting a recreational-vehicle sewer hose have been introduced. U.S. Pat. No. 4,715,570, filed Jul. 7, 1986, to Mashuda, David; U.S. Pat. No. 4,722,500, filed May 30, 1986, to Bray, Jaycee; U.S. Pat. No. 4,905,939, filed Jul. 10, 1989, to Horn, Chris; U.S. Pat. No. 5,067,679, filed Dec. 6, 1990, to Courtney, Charles; U.S. Pat. No. 5,431,455, filed Aug. 5, 1994, to Seely, Stanley; U.S. Pat. No. 5,788,193, filed Jul. 5, 1996, to Hilbert, Gary; U.S. Pat. No. 6,003,819, filed Dec. 30, 1997, to Hall, Carl; U.S. Pat. No. 6,186,449, filed Jun. 30, 1999, to Chrestenson, Robert; U.S. Pat. No. 6,250,847, filed Mar. 24, 1999, to Bingham, Jr., Thomas; U.S. Pat. No. 6,619,596, filed May 2, 2002, to Caine, Donald, Brockington, William, Moore, Antony, and Geible, Norman; U.S. Pat. No. 6,877,700, filed Aug. 28, 2002, to Smith, Dennis; U.S. Pat. No. 7,425,028, filed Nov. 29, 2006, to Angel, Bruce; and U.S. Pat. No. 7,434,771, filed Nov. 14, 2006, to Tai, Lo Yun disclose a variety of systems for supporting and/or protecting a recreational-vehicle sewer hose. All the prior-art inventions have failed to solve many inherent problems associated with such system, as follows:

1) The problems of personal injuries when a user has to overcome the permanent clamping forces from the nuts clamping each of the stakes of the prior-art systems (which prevent the stakes from moving freely at all times). These problems create a lot of pain and difficulties every time a user assembles, disassembles, and adjusts the prior-art systems, especially when the stakes are wet and/or rusted (for example, U.S. Pat. No. 5,431,455 mentioned above);

2) The problems of hazardously and costly unsanitary conditions as a result of personal injuries when a user has to overcome the permanent clamping forces from the nuts clamping each of the stakes of the prior-art systems (which prevent the stakes from moving freely at all times). These problems create a lot of pain and difficulties every time a user assembles, disassembles, and adjusts the prior-art systems, especially when the stakes are wet and/or rusted (for example, U.S. Pat. No. 5,431,455 mentioned above);

3) The problems of hazardous and costly infections as a result of personal injuries when a user has to overcome the permanent clamping forces from the nuts clamping each of the stakes of the prior-art systems (which prevent the stakes from moving freely at all times). These problems create a lot of pain and difficulties every time a user assembles, disassembles, and adjusts the prior-art systems, especially when the stakes are wet and/or rusted (for example, U.S. Pat. No. 5,431,455 mentioned above);

4) The problems of hazardous and costly diseases as a result of personal injuries when a user has to overcome the permanent clamping forces from the nuts clamping each of the stakes of the prior-art systems (which prevent the stakes from moving freely at all times). These problems create a lot of pain and difficulties every time a user assembles, disassembles, and adjusts the prior-art systems, especially when the stakes are wet and/or rusted (for example, U.S. Pat. No. 5,431,455 mentioned above);

5) The problems of tearing and/or damaging of the recreational-vehicle sewer hose caused by exposure to weather conditions, especially where the recreational-vehicle sewer hose changes its direction and orientation (for example, U.S. Pat. No. 5,431,455 and U.S. Pat. No. 4,905,939 mentioned above);

6) The problems of sagging, tearing, and damaging of the recreational-vehicle sewer hose caused by unsupported weight within the recreational-vehicle sewer hose, especially where the sewer hose changes its direction and orientation (for example, U.S. Pat. No. 5,431,455 mentioned above);

7) The problems of sagging, tearing, and damaging of the recreational-vehicle sewer hose as a result of dragging them on the ground (for example, U.S. Pat. No. 5,431,455 mentioned above); and 8) The problems of the general inconvenience associated with elevating each section of the recreational-vehicle sewer hose at a desired angle and connecting the recreational-vehicle sewer hose to the sewage-holding tank.

Therefore, while these above-mentioned systems are fulfilling their respective, particular objectives, there exists a continuing need for a new, improved, durable, safe, and quick-and-easy-to-operate sewer-hose-supporting-and-protecting system. In this regard, the present invention substantially fulfills this need.

OBJECTS AND ADVANTAGES OF THE INVENTION

The sewer-hose-supporting-and-protecting system overcomes all the disadvantages of the prior art heretofore. The sewer-hose-supporting-and-protecting system substantially departs from the conventional concepts and designs of the prior art. In doing so, the sewer-hose-supporting-and-protecting system provides many unique, significant advantages, some of which are, as follows:

1) It is an object of the present invention to provide a new recreational-vehicle sewer-hose-supporting-and-protecting system, which can be used right side up and/or upside down for multi purposes of supporting and protecting a recreational-vehicle sewer hose (This eliminates the problem of the prior art or their components not being able to be used upside down) (for example, U.S. Pat. No. 4,905,939 mentioned above).

2) It is another object of the present invention to provide a new recreational-vehicle sewer-hose-supporting-and-protecting system, whose quick-lock-and-quick-release stake-clamping jaws can quickly and easily lock and release the multi-purpose two-way stakes of the system, to eliminate the use of permanent frictional forces between stakes and nuts in the prior art every time a user assembles, adjusts, disassembles the system and the hose. As a result, this allows the stakes to move freely without any friction, and enables quick, easy, convenient, and safe assembly, adjustment, and disassembly of the system for different shape, height, and angle, to eliminate the risk of personal injuries, infections, and diseases (This eliminates the problem of personal injuries, infections, and diseases caused by the permanent frictional forces required at all times between the rusted stakes and nuts in the prior art) (for example, U.S. Pat. No. 5,431,455 mentioned above).

3) It is a further object of the present invention to provide a new recreational-vehicle sewer-hose-supporting-and-protecting system, whose quick-lock-and-quick-release stake-clamping jaws can quickly and easily lock and release the system at a desired height and angle, by simply rotating the multi-purpose two-way stakes of the system just 45 degrees, to eliminate the use of permanent frictional forces between stakes and nuts in the prior art every time a user adjusts the system and the hose to a desired height and angle. As a result, this allows the stakes to move freely without any friction, and enables quick, easy, convenient, and safe assembly, adjustment, and disassembly of the system for different shape, height, and angle (This eliminates the problem of personal injuries, infections, and diseases caused by the permanent frictional forces required at all times between the rusted stakes and nuts in the prior art).

4) It is an even further object of the present invention to provide a new recreational-vehicle sewer-hose-supporting-and-protecting system, whose multi-purpose two-way stakes:

Can be used right side up or upside down for multi purposes of supporting, stabilizing, and preventing the system from sinking into the ground;

Can move freely up and down without any friction:
  a) To quickly and easily adjust the height of the system to eliminate the risk of personal injury
    (This capability overcomes the disadvantage of the prior art. The prior art uses frictional force and, therefore, prevents its respective stakes from moving freely up and down, creating the risk of personal injury, especially, when its stakes are rusted), and
  b) To quickly and easily assemble, adjust, and disassemble the system to extend the service lifespan of the system
    (This capability overcomes the disadvantage of the prior art. The prior art uses permanent frictional force and, therefore, prevents its respective stakes from moving freely up and down, requiring a large amount of physical effort to assemble, adjust, and disassemble the system, especially, when its stakes are rusted);

Can poke into the ground to maintain a desired shape of and to stabilize all the components of the system; and Only need to rotate just 45 degrees to quickly and easily lock or release the system at or from a desired height and angle, respectively.

(This eliminates the problem of the reliability and durability of the prior art, their components, or a recreational-vehicle sewer hose, which are damaged after a period of use).

5) It is still another object of the present invention to provide a new recreational-vehicle sewer-hose-supporting-and-protecting system, whose pipe-locking nipples and pipe-locking grooves sequentially lock sequential-locking end joints, sequential-locking middle joints, and sequential-locking pipes of the system together, to withstand repetitive impacts while in use, without falling apart (This eliminates the problem of the reliability and durability of the prior art, their components, or a recreational-vehicle sewer hose, which are sagging and falling apart after a period of use).

6) It is still a further object of the present invention to provide a new recreational-vehicle sewer-hose-supporting-and-protecting system, whose sequential-locking end joints, sequential-locking middle joints and sequential-locking pipes can curve in, any desired direction and angle for the system to form any desired shape while supporting and protecting a recreational-vehicle sewer hose (This eliminates the problem of the difficulty and inconvenience in assembling, adjusting, and disassembling the cumbersome, time-consuming, difficult-to-operate components of the prior art).

7) It is still an even further object of the present invention to provide a new recreational-vehicle sewer-hose-supporting-and-protecting system, whose sequential-locking end joints, sequential-locking middle joints, and sequential-locking pipes can securely function, both right side up and upside down, to support and protect a recreational-vehicle sewer hose, at the same time (This eliminates the problem of the reliability and durability of the prior art, their components, or a recreational-vehicle sewer hose, which are sagging and falling apart after a period of use).

8) It is still yet another object of the present invention to provide a new recreational-vehicle sewer-hose-supporting-and-protecting system, whose components sequentially lock one another to withstand repetitive impacts while in use, without sagging or falling apart (This eliminates the problem of the reliability and durability of the prior art, their components, or a recreational-vehicle sewer hose, which are sagging and falling apart after a period of use).

9) It is still yet a further object of the present invention to provide a new recreational-vehicle sewer-hose-supporting-and-protecting system, which will securely function both right side up and upside down, will not sag over a long distance, and thus will not eventually bend or break over extended periods of use (This eliminates the problem of the reliability and durability of the prior art, their components, or a recreational-vehicle sewer hose, which are sagging and falling apart after a period of use).

Therefore, the new recreational-vehicle sewer-hose-supporting-and-protecting system is quick, easy, convenient, and safe to assemble, adjust, and disassemble for supporting and protecting a recreational-vehicle sewer hose, in a desired shape and at a desired height and angle. As a result, the new recreational-vehicle sewer-hose-supporting-and-protecting system overcomes all the disadvantages of the prior art. These above and additional advantages are described and illustrated in the following examples and illustrations.

BRIEF DESCRIPTION OF THE DRAWINGS

FIGS. 22, 23, 24, 25, and 26 illustrate how to assemble the sewer-hose-supporting-and-protecting system.

FIG. 30 illustrates a variation of the sewer-hose-supporting-and-protecting system, which supports and also protects a recreational-vehicle sewer hose.

FIG. 31 illustrates the variation of the sewer-hose-supporting-and-protecting system using both right-side-up and upside-down jaw screws, which supports and also protects a recreational-vehicle sewer hose.

SUMMARY OF THE INVENTION

Figure 1:
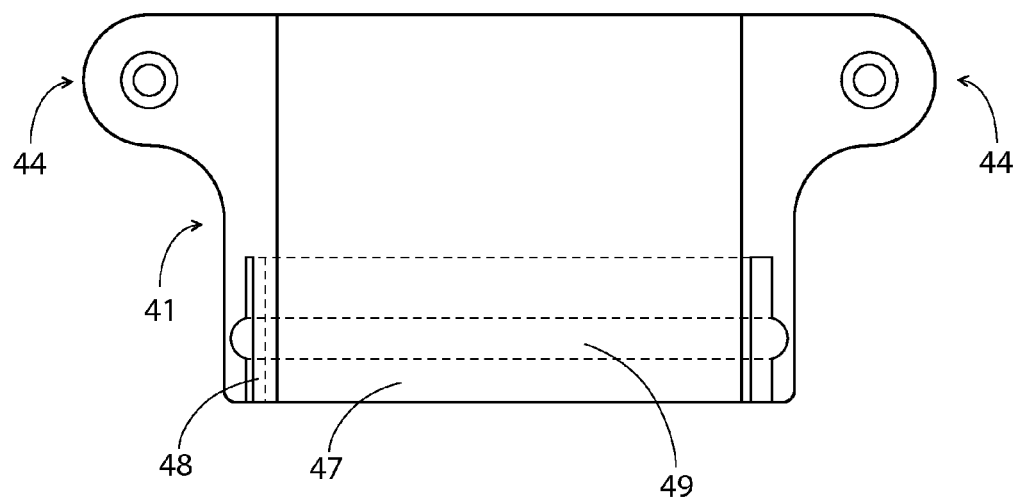
FIG. 1 illustrates a top view of a sequential-locking end joint of the sewer-hose-supporting-and-protecting system.

A quick-lock-and-quick-release system, using predetermined clamping and releasing methods to be assembled, disassembled, and adjusted for supporting and protecting a recreational-vehicle sewer hose, comprises a first semi-circular sequential-locking end joint, a second semi-circular sequential-locking end joint, semi-circular sequential-locking middle joints, quick-lock-and-quick-release stake-clamping jaw screws, quick-lock-and-quick-release jaw-squeezing chamber nuts, square-cross-section multi-purpose two-way stakes, and semi-circular sequential-locking pipes.

Each of the first and second sequential-locking end joints and sequential-locking middle joints has a pipe-locking channel, a pipe stopper, and a pipe-locking groove for releasably and sequentially locking the sequential-locking pipes thereto.

Each of the quick-lock-and-quick-release stake-clamping jaw screws has a tunnel for one of the multi-purpose two-way stakes to be inserted therethrough, and a set of quick-lock-and-quick-release arrowhead-shaped stake-clamping jaws for quickly clamping on and quickly releasing one of the multi-purpose two-way stakes to releasably and sequentially lock it and to allow it to move freely without any friction to eliminate personal injuries, infections, and diseases when each of the quick-lock-and-quick-release stake-clamping, jaw screws is rotated in opposite directions, respectively. Each of the quick-lock-and-quick-release stake-clamping jaw screws is screwed into one of the quick-lock-and-quick-release jaw-squeezing chamber nuts.

The quick-lock-and-quick-release jaw-squeezing chamber nuts are integrated into the opposite sides of the first and second end joints and middle joints.

Each of the quick-lock-and-quick-release jaw-squeezing chamber nuts has a threaded nut bore and a quick-lock-and-quick-release jaw-squeezing frustum-shaped chamber for quickly squeezing and quickly releasing a set of the quick-lock-and-quick-release arrowhead-shaped stake-clamping jaws when the set of the quick-lock-and-quick-release arrowhead-shaped stake-clamping jaws is rotated in opposite directions, respectively.

Each of the square-cross-section multi-purpose two-way stakes has a stake foot-knob for being used upside down as a foot to prevent the square-cross-section two-way stakes from sinking into the soft ground to stabilize the sewer-hose-supporting-and-protecting system, and for being used right side up as a knob to rotate the square-cross-section multi-purpose two-way stakes.

Each of the sequential-locking pipes has two opposite sets of pipe-locking nipples disposed at predetermined locations thereon to be inserted into the pipe-locking grooves to releasably and sequentially lock the sequential-locking pipes to the first and second sequential-locking end joints and sequential-locking middle joints.

PREFERRED EMBODIMENT

Structure and Function

A sewer-hose-supporting-and-protecting system, for supporting and protecting a recreational-vehicle sewer hose, comprises two sequential-locking end joints 41, a plurality of sequential-locking middle joints 42, a plurality of quick-lock-and-quick-release stake-clamping jaw screws 43, a plurality of quick-lock-and-quick-release jaw-squeezing chamber nuts 44, a plurality of multi-purpose two-way stakes 45, and a plurality of sequential-locking pipes 46.

Figure 2:
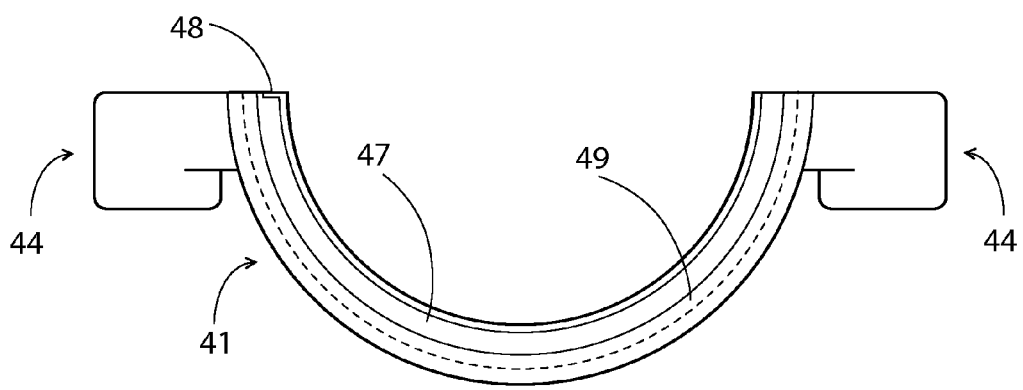
FIG. 2 illustrates a front view of the sequential-locking end joint of the sewer-hose-supporting-and-protecting system.
Figure 3:
FIG. 3 illustrates a bottom view of the sequential-locking end joint of the sewer-hose-supporting-and-protecting system.
Figure 4:
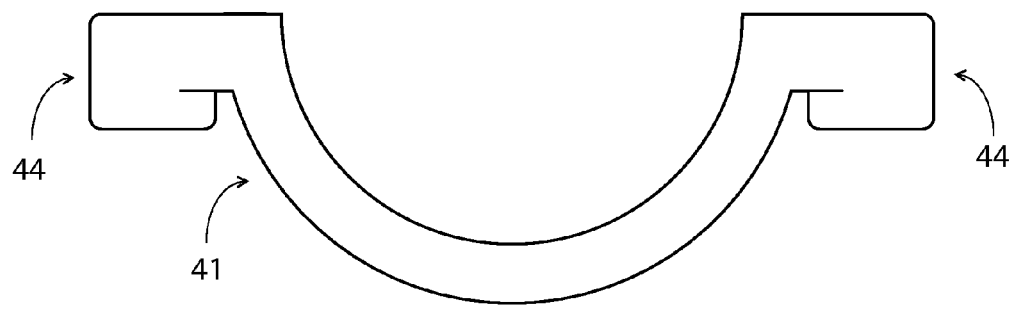
FIG. 4 illustrates a rear view of the sequential-locking end joint of the sewer-hose-supporting-and-protecting system.

Referring to FIGS. 1, 2, 3, and 4: FIG. 1 illustrates a top view of sequential-locking end joint 41; FIG. 2 illustrates a front view of sequential-locking end joint 41; FIG. 3 illustrates a bottom view of sequential-locking end joint 41; and FIG. 4 illustrates a rear view of sequential-locking end joint 41.

Each of sequential-locking end joints 41 is for being used right side up or upside down, and is for locking an end of one sequential-locking pipe 46 therein. Each of sequential-locking end joints 41 is semi-circular, and has one pipe-locking channel 47, one pipe stopper 48, and one pipe-locking groove 49.

Each pipe-locking channel 47 is semi-circular, and is integrated into an end of one sequential-locking end joint 41. Each pipe stopper 48 is straight and is integrated into an end of one pipe-locking channel 47. Each pipe-locking groove 49 is semi-circular, and is disposed along one pipe-locking channel 47. Each pipe-locking groove 49 extends the full length of and communicates with one pipe-locking channel 47.

Figure 5:
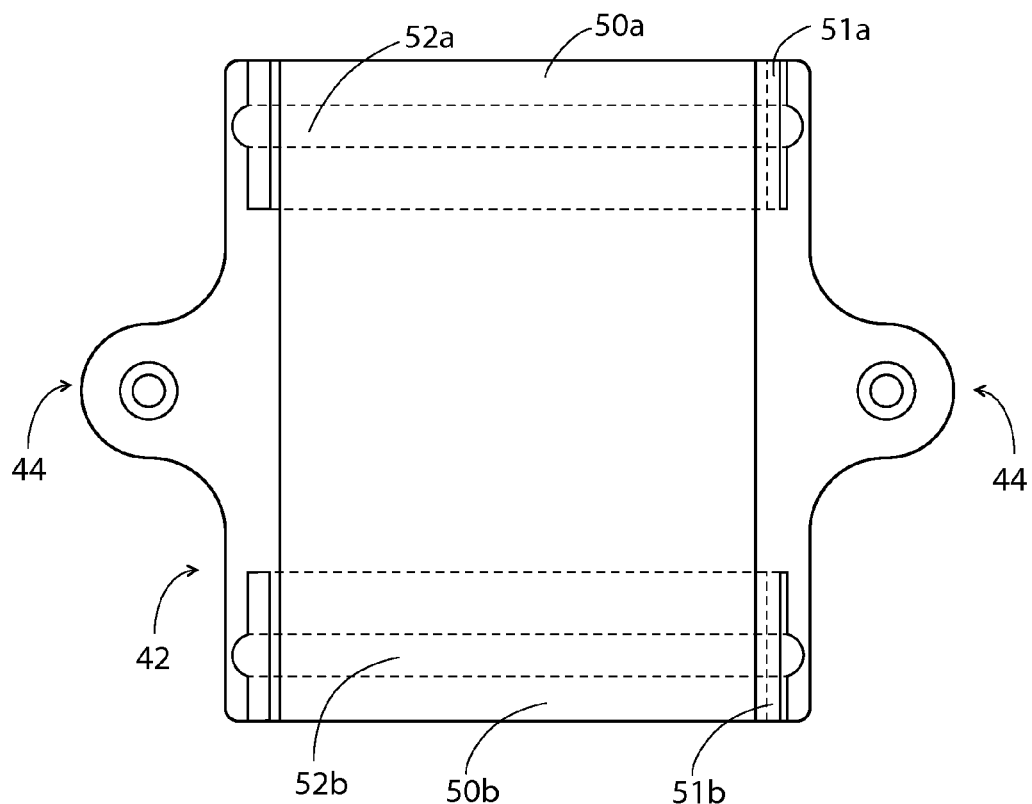
FIG. 5 illustrates a top view of a sequential-locking middle joint of the sewer-hose-supporting-and-protecting system.
Figure 6:
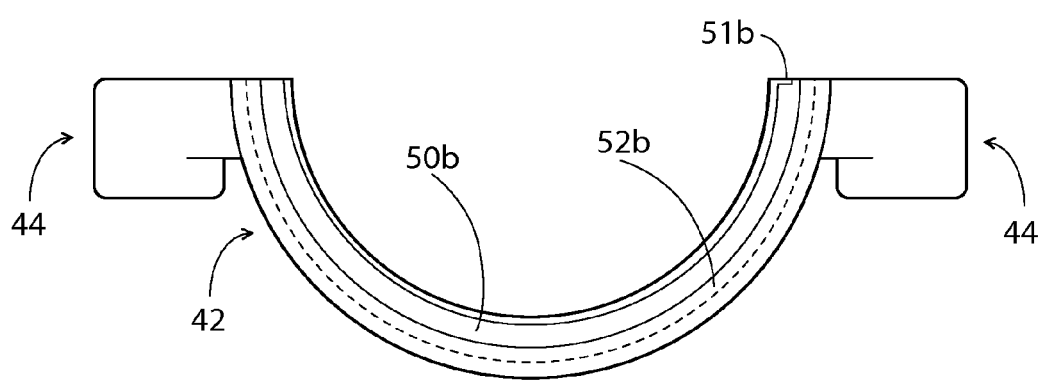
FIG. 6 illustrates a front view of the sequential-locking middle joint of the sewer-hose-supporting-and-protecting system.
Figure 7:
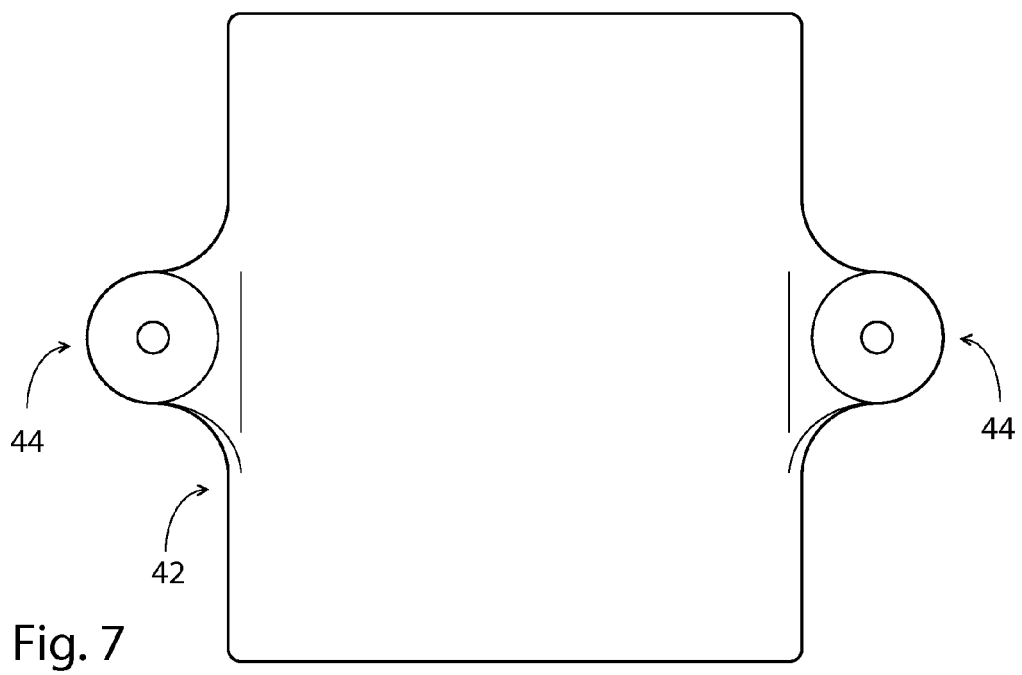
FIG. 7 illustrates a bottom view of the sequential-locking middle joint of the sewer-hose-supporting-and-protecting system.

Referring to FIGS. 5, 6, and 7: FIG. 5 illustrates a top view of sequential-locking middle joint 42; FIG. 6 illustrates a front view of sequential-locking middle joint 42; and FIG. 7 illustrates a bottom view of sequential-locking middle joint 42.

Each of sequential-locking middle joints 42 is for being used right side up or upside down, and is for locking together two ends of two sequential-locking pipes 46, respectively. Each of sequential-locking middle joints 42 is semi-circular, and has two pipe-locking channels 50a and 50b, two pipe stoppers 51a and 51b, and two pipe-locking grooves 52a and 52b.

Each of pipe-locking channels 50a and 50b is semi-circular, and is integrated into one of the two opposite ends of one sequential-locking middle joint 42. Each of pipe stoppers 51a and 51b is straight and is integrated into an end of one of pipe-locking channels 50a and 50b. Each of pipe-locking grooves 52a and 52b is semi-circular, and is disposed along one of pipe-locking channels 50a and 50b. Each of pipe-locking grooves 52a and 52b extends the full length of and communicates with one of pipe-locking channels 50a and 50b.

Figure 8:
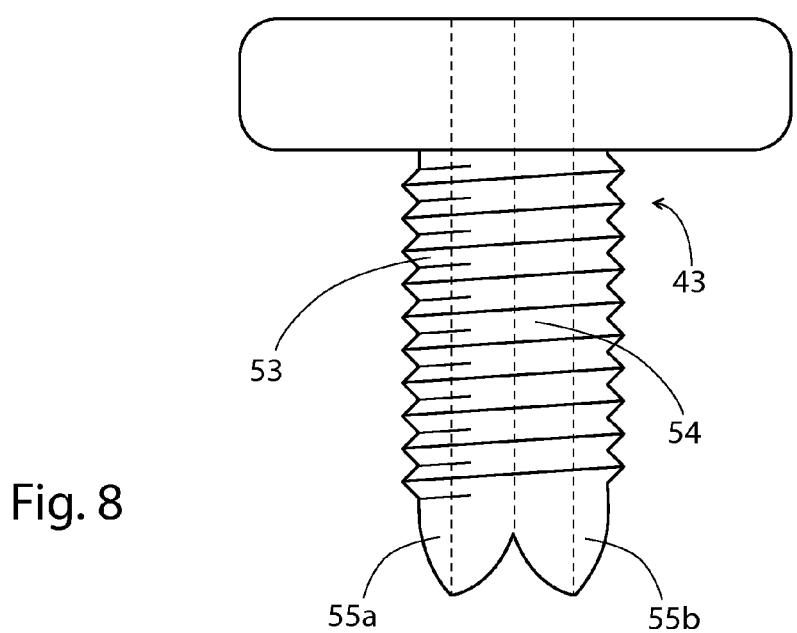
FIG. 8 illustrates a side view of a quick-lock-and-quick-release stake-clamping jaw screw of the sewer-hose-supporting-and-protecting system.
Figure 9:
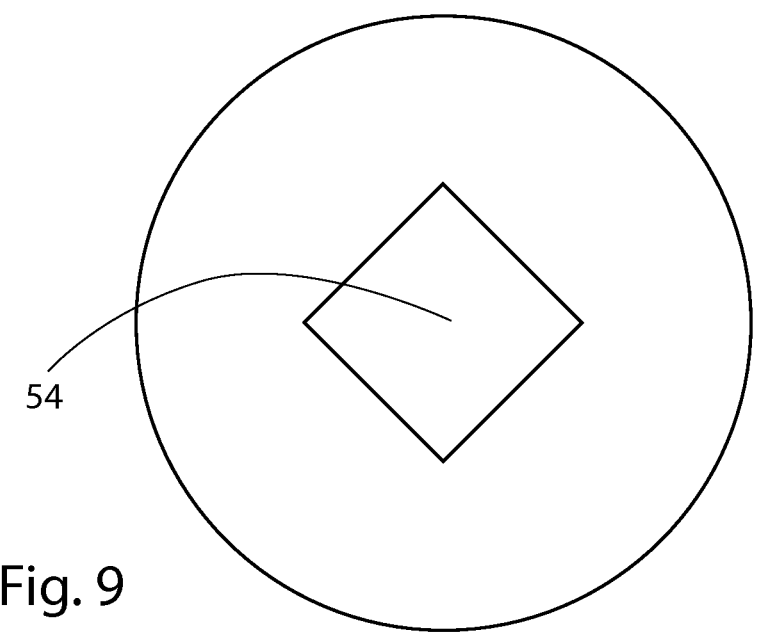
FIG. 9 illustrates a top view of the quick-lock-and-quick-release stake-clamping jaw screw of the sewer-hose-supporting-and-protecting system.
Figure 10:
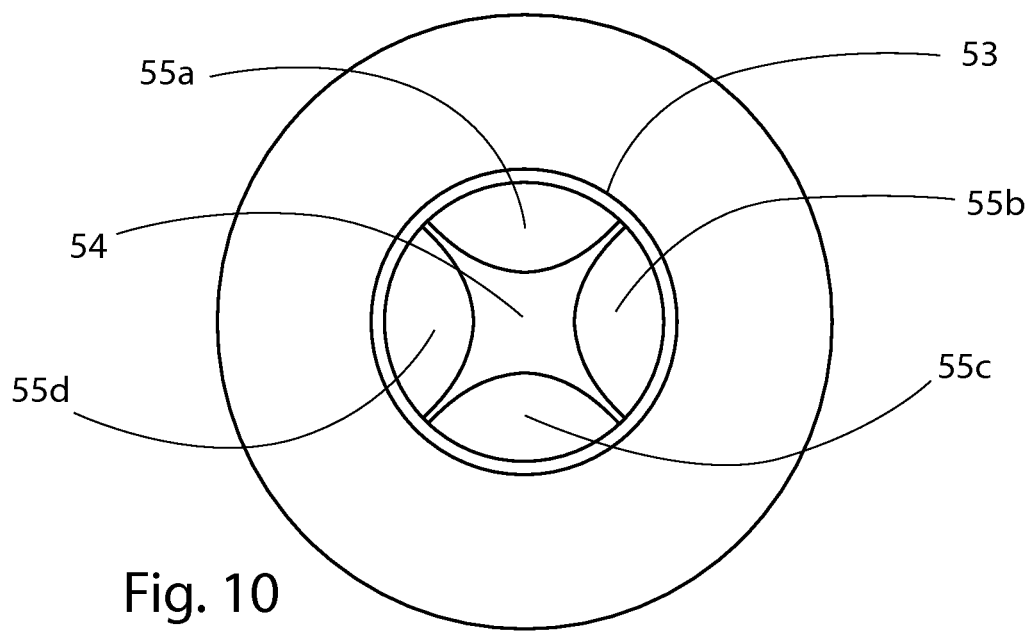
FIG. 10 illustrates a bottom view of the quick-lock-and-quick-release stake-clamping jaw screw of the sewer-hose-supporting-and-protecting system.
Figure 11:
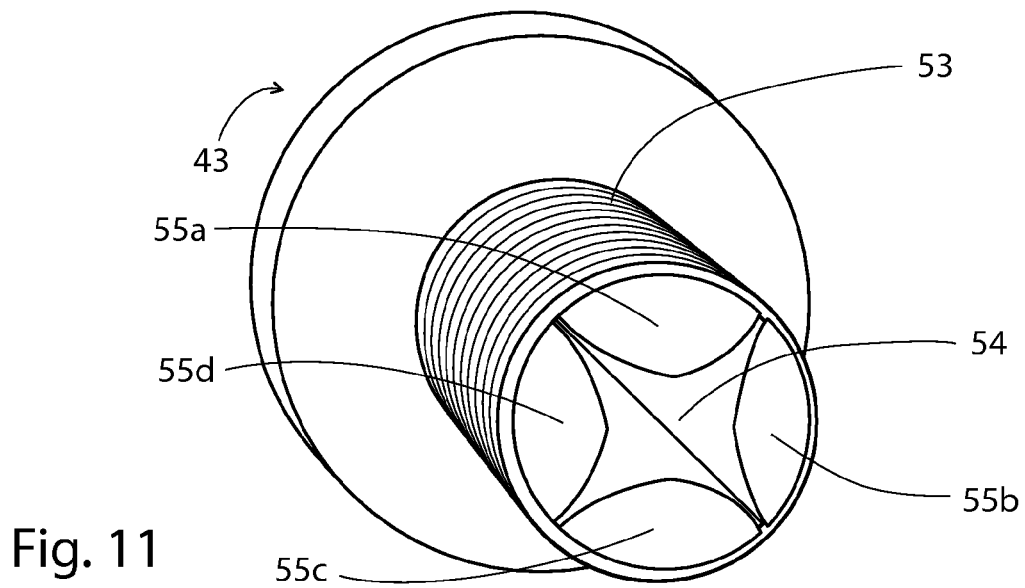
FIG. 11 illustrates a three-dimensional view of the quick-lock-and-quick-release stake-clamping jaw screw.

Referring to FIGS. 8, 9, 10, and 11: FIG. 8 illustrates a side view of quick-lock-and-quick-release stake-clamping jaw screw 43; FIG. 9 illustrates a top view of quick-lock-and-quick-release stake-clamping jaw screw 43; FIG. 10 illustrates a bottom view of quick-lock-and-quick-release stake-clamping jaw screw 43; and FIG. 11 illustrates a three-dimensional view of quick-lock-and-quick-release stake-clamping jaw screw 43.

Each of quick-lock-and-quick-release stake-clamping jaw screws 43 is for being used right side up or upside down, and is for one multi-purpose two-way stake 45 to be inserted therethrough, to clamp on and lock one multi-purpose two-way stake 45. Each of quick-lock-and-quick-release stake-clamping jaw screws 43 has a screw shaft 53, a screw tunnel 54, and four quick-lock-and-quick-release stake-clamping jaws 55a, 55b, 55c, and 55d.

Each screw shaft 53 is threaded. Each screw tunnel 54 has a square cross-section. Each screw tunnel 54 is integrated into and extends the full length of one screw shaft 53 along its longitudinal axis. Each of quick-lock-and-quick-release stake-clamping jaws 55a, 55b, 55c, and 55d is arrowhead-shaped and is integrated into an end of one screw shaft 53 at a predetermined location and orientation thereon. Four quick-lock-and-quick-release stake-clamping jaws 55a, 55b, 55c, and 55d of each quick-lock-and-quick-release stake-clamping jaw screws 43 are for clamping on and securing one multi-purpose two-way stake 45.

Figure 12:
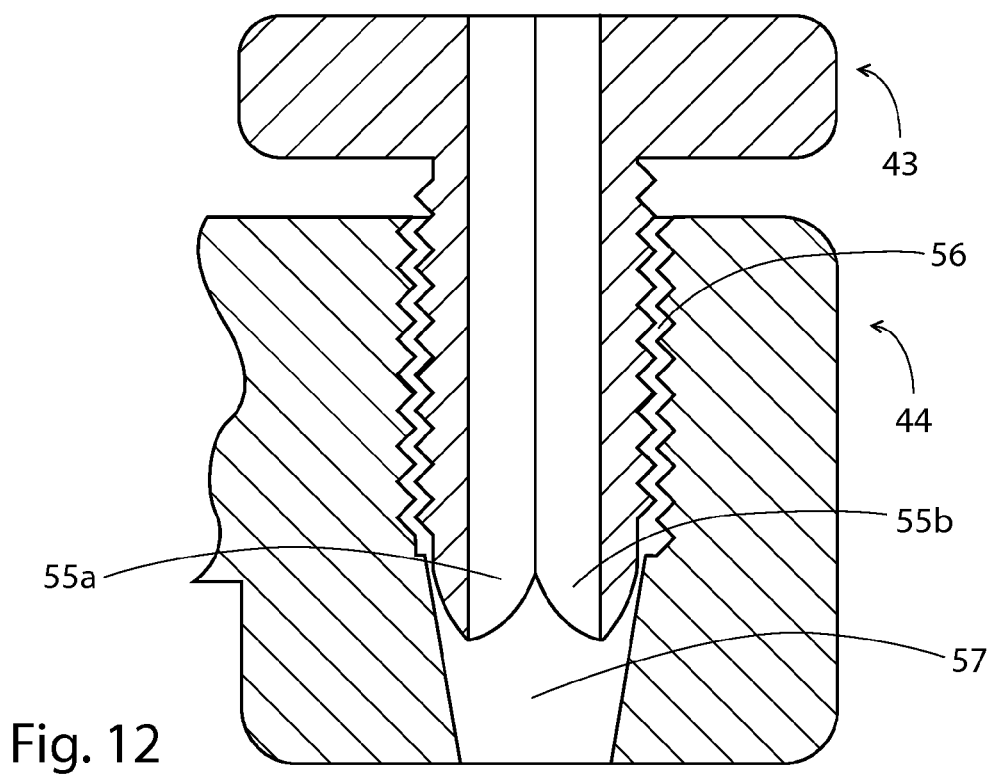
FIG. 12 illustrates a cross-sectional view of the quick-lock-and-quick-release stake-clamping jaw screw being screwed into a quick-lock-and-quick-release jaw-squeezing chamber nut of the system.
Figure 13:
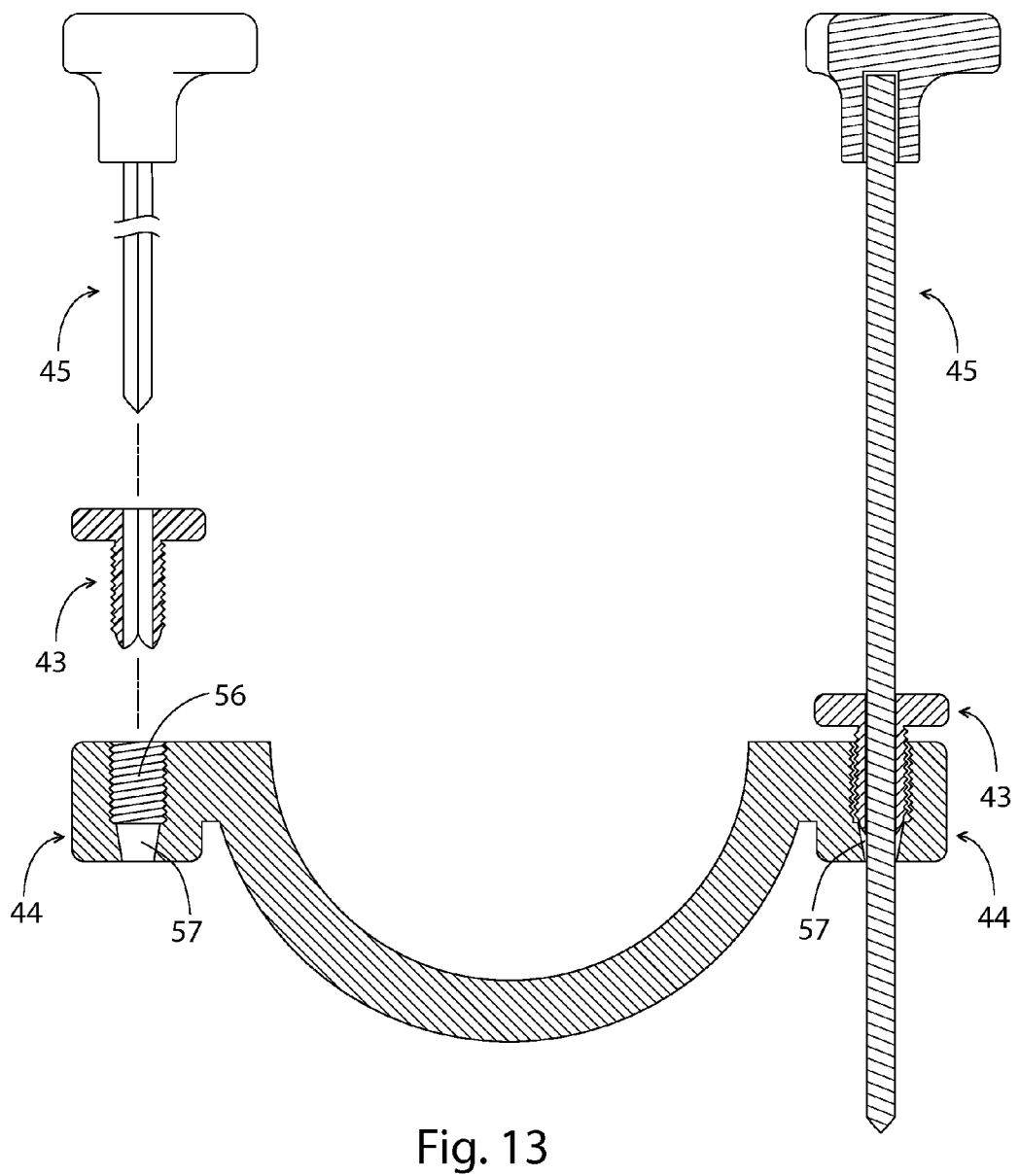
FIG. 13 illustrates a cross-sectional view of quick-lock-and-quick-release stake-clamping jaw screws, quick-lock-and-quick-release jaw-squeezing chamber nuts, and multi-purpose two-way stakes being assembled together.

Referring to FIGS. 12 and 13: FIG. 12 illustrates a cross-sectional view of quick-lock-and-quick-release stake-clamping jaw screw 43 being screwed into quick-lock-and-quick-release jaw-squeezing chamber nuts 44; and FIG. 13 illustrates a cross-sectional view of quick-lock-and-quick-release stake-clamping jaw screws 43, quick-lock-and-quick-release jaw-squeezing chamber nuts 44, and multi-purpose two-way stakes 45 being assembled together.

Each of quick-lock-and-quick-release jaw-squeezing chamber nuts 44 is for being used right side up or upside down, and is for squeezing four quick-lock-and-quick-release stake-clamping jaws 55a, 55b, 55c, and 55d to clamp on and lock one multi-purpose two-way stake 45. Each of quick-lock-and-quick-release jaw-squeezing chamber nuts 44 is mated to one quick-lock-and-quick-release stake-clamping jaw screw 43, and is integrated into one of the two opposite sides of one sequential-locking end joint 41 or one of the two opposite sides of one sequential-locking middle joint 42. Each of quick-lock-and-quick-release jaw-squeezing chamber nuts 44 has a nut bore 56 and a quick-lock-and-quick-release jaw-squeezing chamber 57.

Each nut bore 56, is threaded such that each quick-lock-and-quick-release jaw-squeezing chamber nut 44 is mated to one quick-lock-and-quick-release stake-clamping jaw screw 43. Each nut bore 56 is integrated into one quick-lock-and-quick-release jaw-squeezing chamber nut 44. Each quick-lock-and-quick-release jaw-squeezing chamber 57 is shaped as a frustum. Each quick-lock-and-quick-release jaw-squeezing chamber 57 is integrated into an end of one nut bore 56, and is for squeezing four quick-lock-and-quick-release stake-clamping jaws 55a, 55b, 55c, and 55d to clamp on and lock one multi-purpose two-way stake 45.

Figure 14:
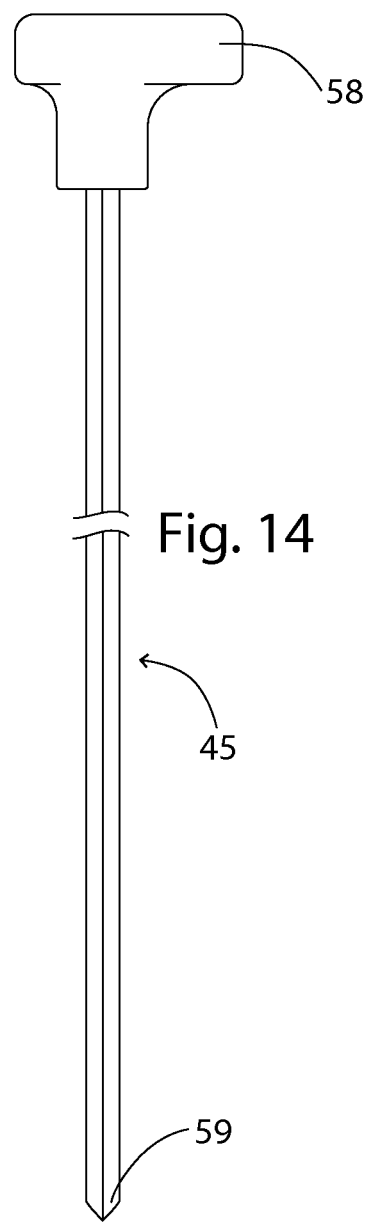
FIG. 14 illustrates a side view of the multi-purpose two-way stake.
Figure 15:
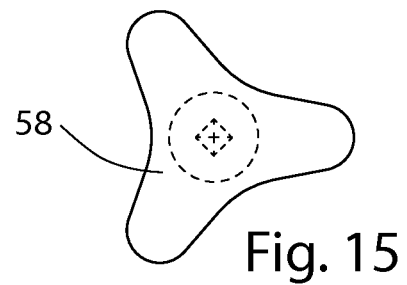
FIG. 15 illustrates a top view of the multi-purpose two-way stake.
Figure 16:
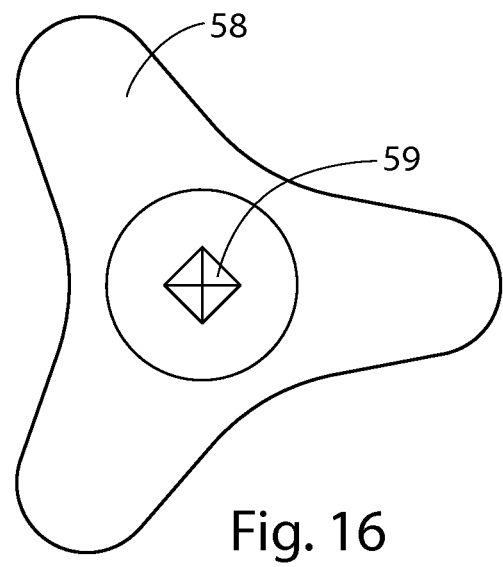
FIG. 16 illustrates a bottom view of the multi-purpose two-way stake.

Referring to FIGS. 14, 15, and 16: FIG. 14 illustrates a side view of multi-purpose two-way stake 45; FIG. 15 illustrates a top view of multi-purpose two-way stake 45; and FIG. 16 illustrates a bottom view of multi-purpose two-way stake 45.

Each of multi-purpose two-way stakes 45 is for being used right side up or upside down, is for rotating one quick-lock-and-quick-release stake-clamping jaw screw 43 to squeeze its four quick-lock-and-quick-release stake-clamping jaws 55a, 55b, 55c, and 55d to clamp on and lock itself, and is for supporting, securing, releasing, and adjusting the height of the sewer-hose-supporting-and-protecting system. Each of multi-purpose two-way stakes 45 is mated to and is able to move freely up and down without any friction through screw tunnel 54 of one quick-lock-and-quick-release stake-clamping jaw screw 43. Each of multi-purpose two-way stakes 45 has a square cross-section. Each of multi-purpose two-way stakes 45 has a stake foot-knob 58 and a stake end 59.

Each stake foot-knob 58 is flaring, and is molded on the opposite end of stake end 59 of one multi-purpose two-way stake 45. Each stake foot-knob 58 is for preventing one multi-purpose two-way stake 45 from sinking into, for example, wet soil to stabilize the sewer-hose-supporting-and-protecting system, and is for a user to conveniently hold on to rotate one multi-purpose two-way stake 45 to quickly and easily squeeze or release four quick-lock-and-quick-release stake-clamping jaws 55a, 55b, 55c, and 55d to quickly and easily clamp on or release one multi-purpose two-way stake 45, respectively. Each stake end 59 is pointed, and is for poking into, for example, soft ground to stabilize the sewer-hose-supporting-and-protecting system.

Figure 17:
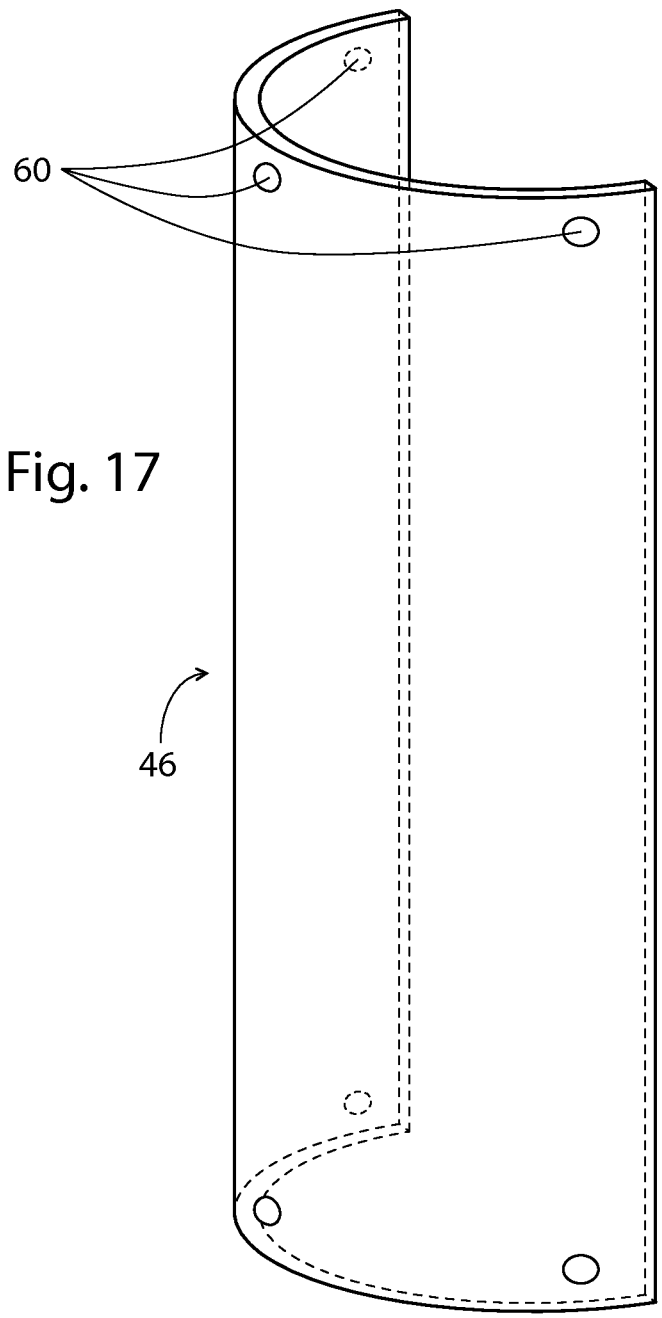
FIG. 17 illustrates a three-dimensional view of a sequential-locking pipe of the sewer-hose-supporting-and-protecting system.

Referring to FIG. 17, FIG. 17 illustrates a three-dimensional view of sequential-locking pipe 46.

Each of sequential-locking pipes 46 is for being used right side up or upside down, and is for supporting and protecting a recreational-vehicle sewer hose. Each of sequential-locking pipes 46 is semi-circular and has a plurality of pipe-locking nipples 60.

Each pipe-locking nipple 60 is integrated into one of the two opposite ends of one sequential-locking pipe 46 at a predetermined location and orientation thereon.

Material

Each component of the sewer-hose-supporting-and-protecting system, independently from the others of the system, can be partially or entirely made of rigid material, non-rigid material, flexible material, non-flexible material, pliable material, non-pliable material, elastic material, non-elastic material, resilient material, non-resilient material, or a combination of at least two of the above.

For example, quick-lock-and-quick-release stake-clamping jaws 55a, 55b, 55c, and 55d of each quick-lock-and-quick-release stake-clamping jaw screw 43 can be made of resilient or semi-resilient material such that quick-lock-and-quick-release stake-clamping jaws 55a, 55b, 55c, and 55d are capable of bending when they are squeezed by an external force, and are capable of returning to their original shapes when the external force is canceled without fracturing or being damaged.

For another example, each multi-purpose two-way stake 45 can be made of iron, copper, zinc, bronze, tin, alloy, aluminum, stainless steel, or a combination of at least two of the above.

For another example, sequential-locking end joints 41, sequential-locking middle joints 42, quick-lock-and-quick-release stake-clamping jaw screws 43, quick-lock-and-quick-release jaw-squeezing chamber nuts 44, and sequential-locking pipes 46 can be made of plastic, plastic composite, plasticized material, ABC, PVC, fiber class, or a combination of at least two of the above.

For another example, any component of the sewer-hose-supporting-and-protecting system can be made of plasticized material, metallic material, or a combination of the two above.

For another example, any component of the sewer-hose-supporting-and-protecting system can be made of plastic, plastic composite, plasticized material, ABC, PVC, fiber class, iron, copper, zinc, bronze, tin, alloy, aluminum, stainless steel, or a combination of at least two of the above.

Unique Function

Figure 18:
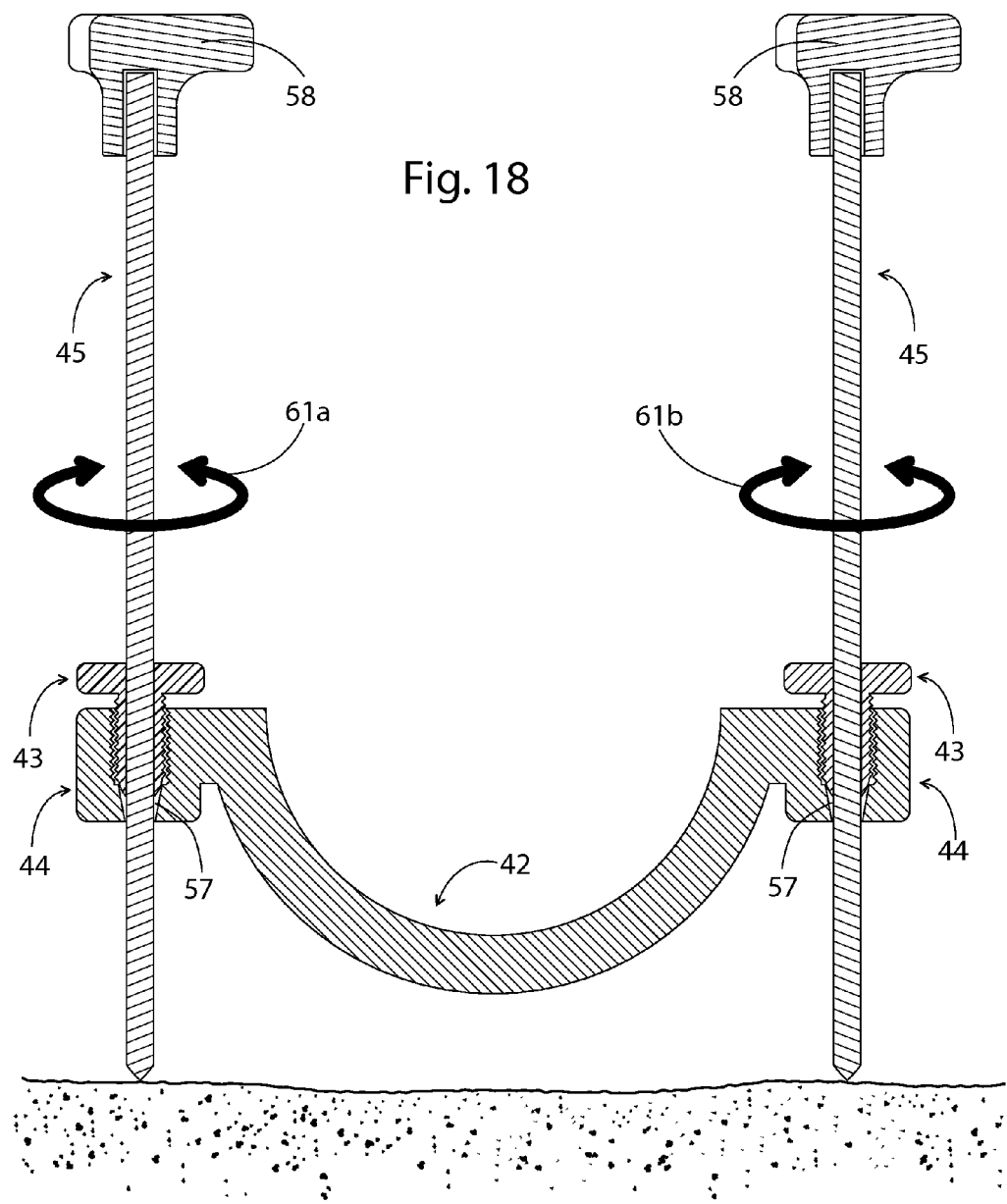
FIGS. 18 and 19 illustrate a cross-sectional view of the multi-purpose two-way stakes capable of being used right side up or upside down.
Figure 19:
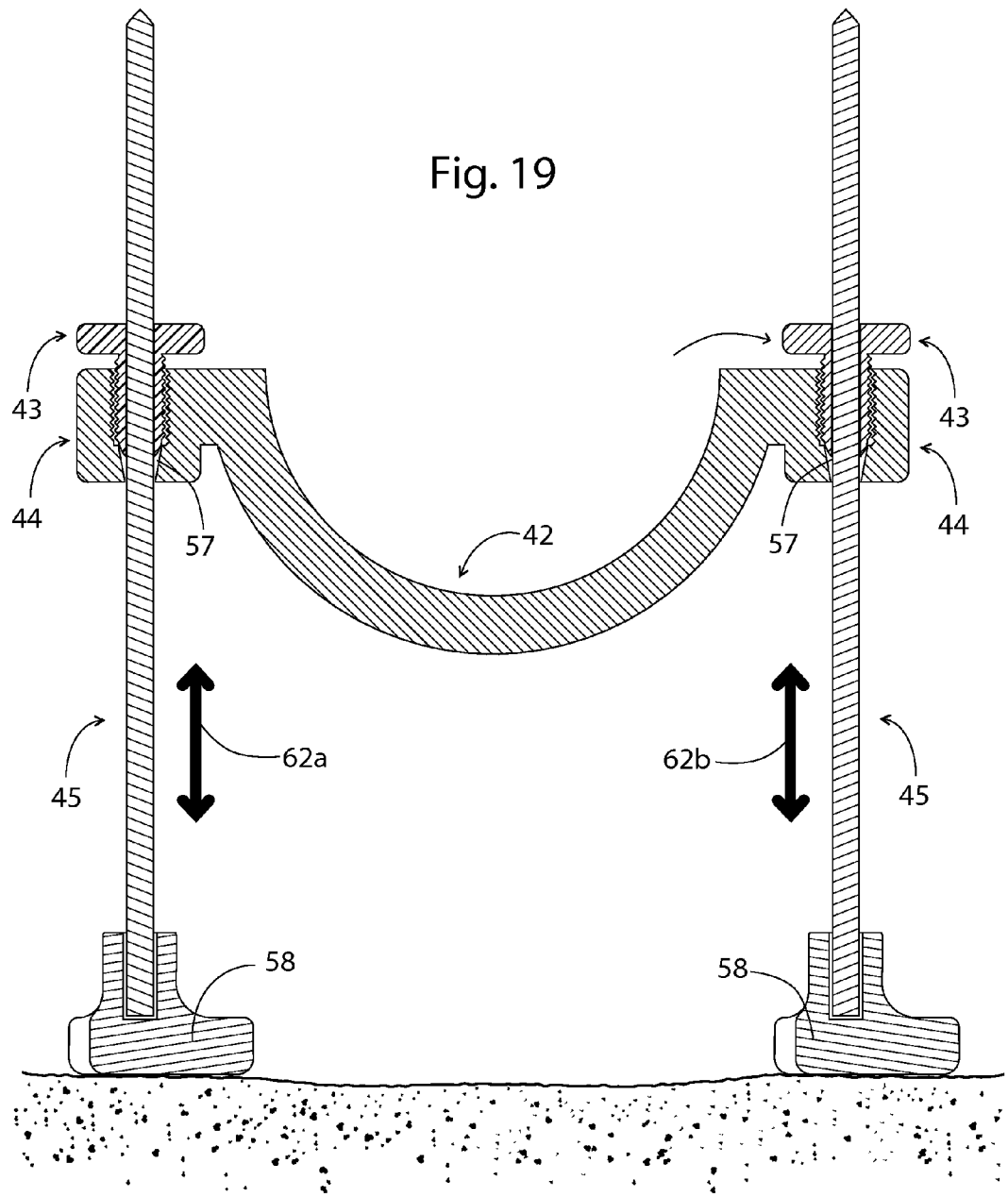
Figure 20:
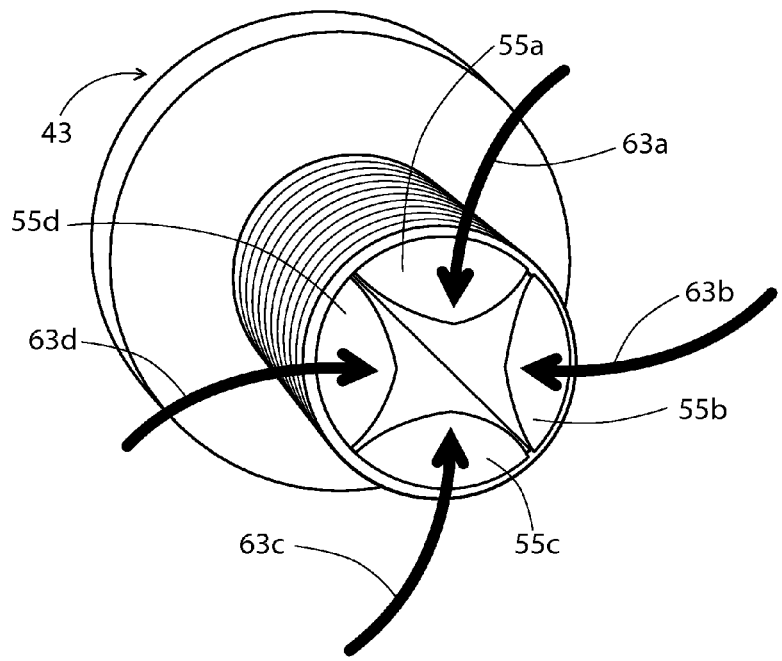
FIGS. 20 and 21 illustrate a three-dimensional view of how quick-lock-and-quick-release stake-clamping jaws of the quick-lock-and-quick-release stake-clamping jaw screw clamp on and release the multi-purpose two-way stake.
Figure 21:
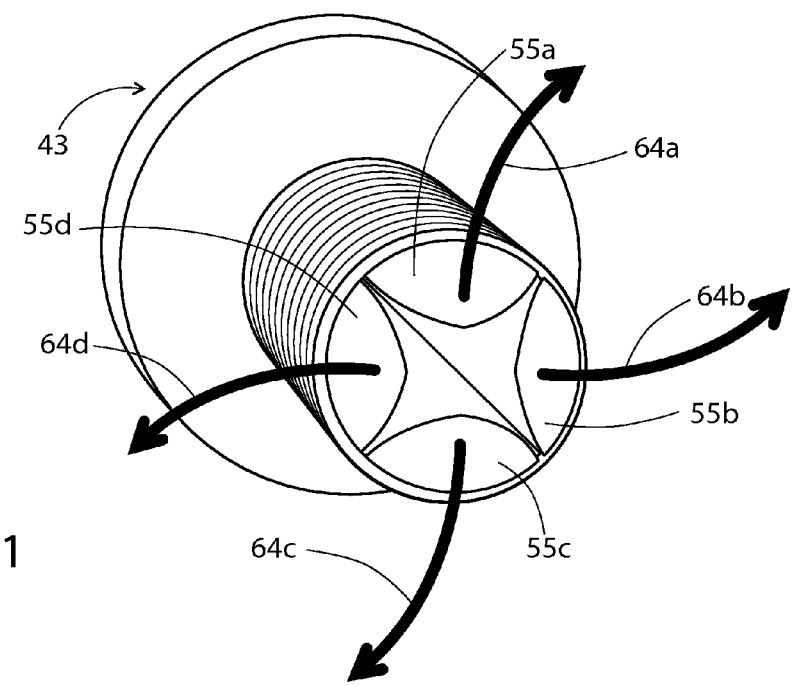
Figure 22:
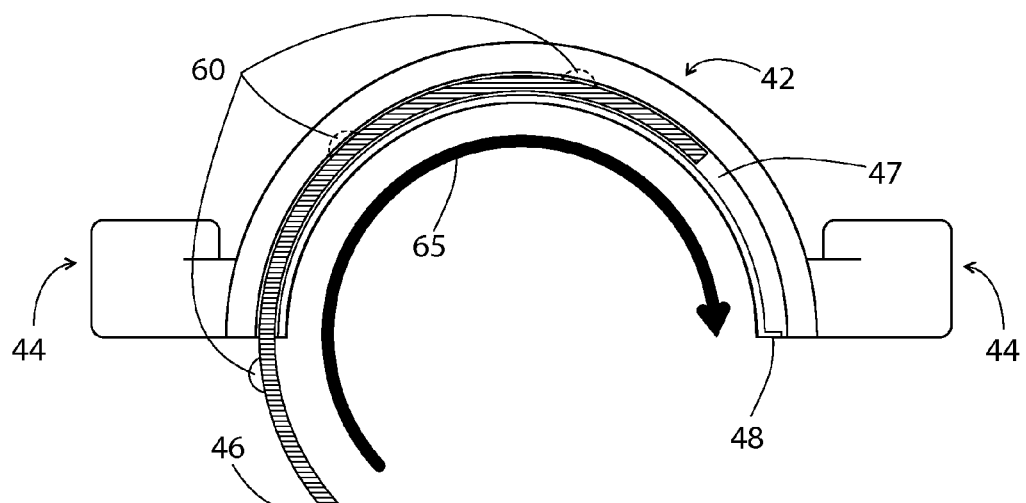
Figure 23:
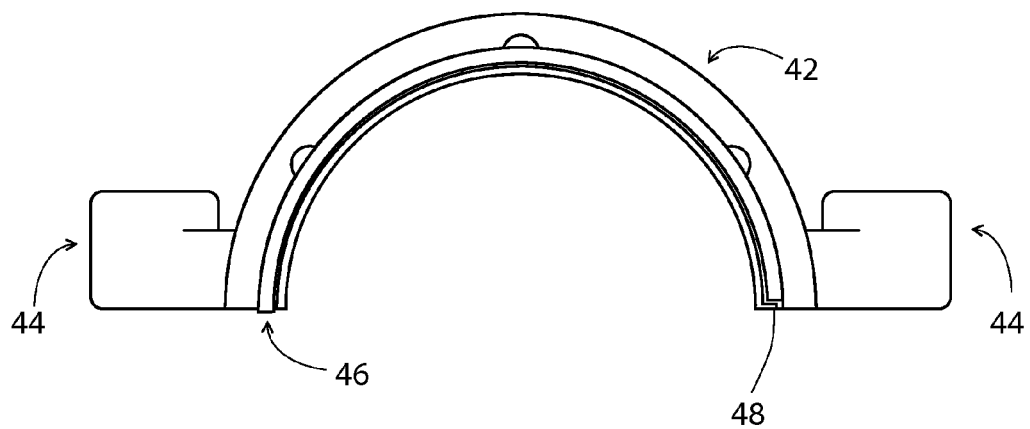
Figure 24:
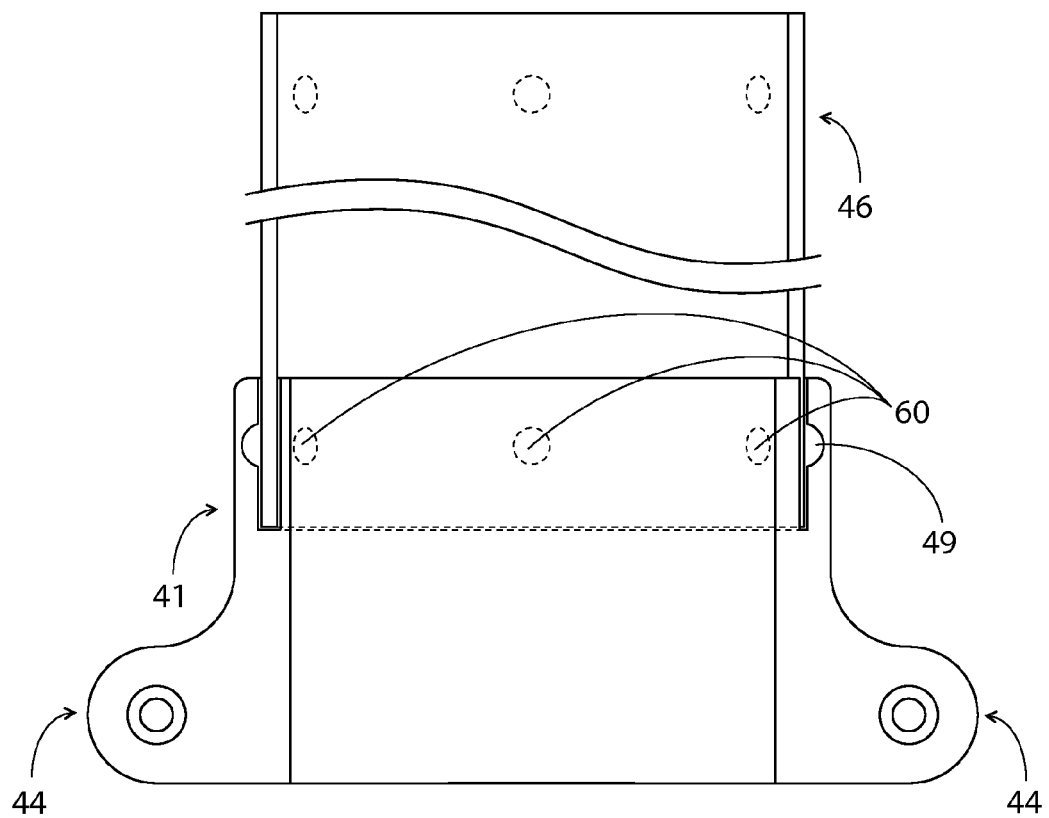
Figure 25:
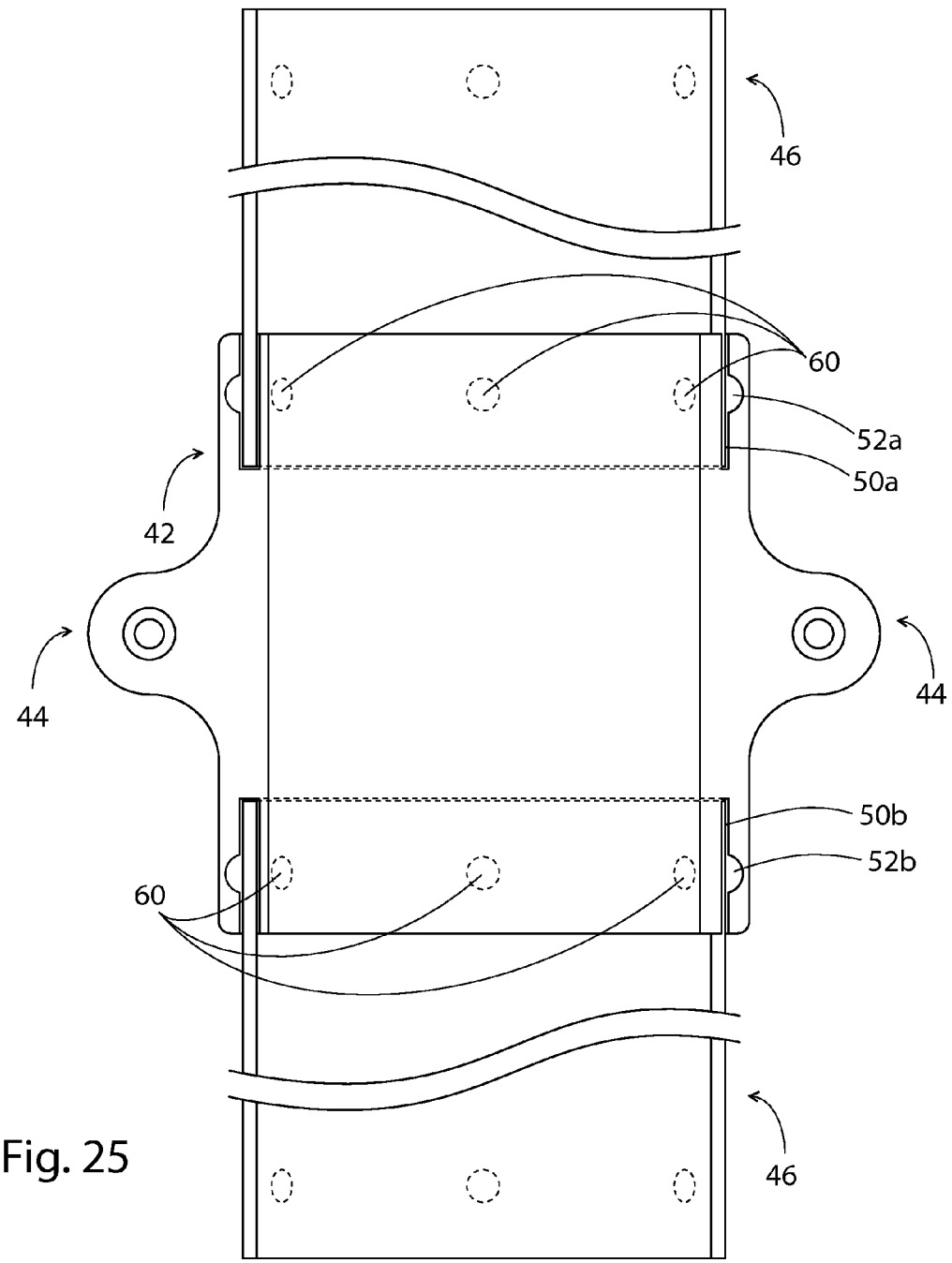

Eliminating all disadvantages inherent in all the prior art heretofore, the sewer-hose-supporting-and-protecting system offers many unique functions and capabilities, as follows:
A) For Each Multi-Purpose Two-Way Stake 45
  1) Referring to FIGS. 18 and 19, each multi-purpose two-way stake 45 can be used right side up or upside down such that each stake foot-knob 58 can perform multi duties, as follows:
    a) Referring to FIG. 18, each stake foot-knob 58 can function as a knob (FIG. 18) for a user to hold on to rotate one respective multi-purpose two-way stake 45 in the opposite directions of arrows 61a or 61b, and
    b) Referring to FIG. 19, each stake foot-knob 58 can function as a foot (FIG. 19) for preventing one respective multi-purpose two-way stake 45 from sinking into wet ground;
  2) Referring to FIGS. 18 and 19, each multi-purpose two-way stake 45 can move freely up and down without any friction through screw tunnel 54 of any quick-lock-and-quick-release stake-clamping jaw screw 43 in the opposite directions of arrows 62a or 62b;
  3) Referring to FIG. 20, each multi-purpose two-way stake 45 can rotate (for example, just 45 degrees clockwise) to easily rotate one respective quick-lock-and-quick-release stake-clamping jaw screw 43 such that quick-lock-and-quick-release jaw-squeezing chamber 57 of one respective quick-lock-and-quick-release jaw-squeezing chamber nut 44 (FIG. 12) squeezes four quick-lock-and-quick-release stake-clamping jaws 55a, 55b, 55c, and 55d of one respective quick-lock-and-quick-release stake-clamping jaw screws 43 in the directions of arrows 63a, 63b, 63c, or 63d (FIG. 20) to clamp on and lock each multi-purpose two-way stake 45 in one respective quick-lock-and-quick-release stake-clamping jaw screw 43; and
  4) Referring to FIG. 21, each multi-purpose two-way stake 45 can rotate (for example, just 45 degrees counterclockwise) to easily rotate one respective quick-lock-and-quick-release stake-clamping jaw screw 43 such that quick-lock-and-quick-release jaw-squeezing chamber 57 of one respective quick-lock-and-quick-release jaw-squeezing chamber nut 44 (FIG. 12) releases four quick-lock-and-quick-release stake-clamping jaws 55a, 55b, 55c, and 55d of one respective quick-lock-and-quick-release stake-clamping jaw screws 43 in the directions of arrows 64a, 64b, 64c, or 64d (FIG. 21) to release and allow each multi-purpose two-way stake 45 to move freely up and down without any friction through one respective quick-lock-and-quick-release stake-clamping jaw screw 43.
B) For all the Components of the Sewer-Hose-Supporting-and-Protecting System
  1) All pipe-locking channels 47, 50a, and 50b sequentially lock the ends of all sequential-locking pipes 46 in predetermined semi-circular locations, respectively;
  2) All pipe stoppers 48, 51a, and 51b sequentially lock the ends of all sequential-locking pipes 46 in predetermined linear locations, respectively;
  3) All pipe-locking grooves 49, 52a, and 52b sequentially lock all pipe-locking nipples 60 in predetermined semi-circular locations, respectively;
  4) All stake ends 59 sequentially lock the sewer-hose-supporting-and-protecting system in predetermined locations in the ground when poking therein such that the system forms a predetermined shape, at a predetermined height and angle; and
  5) All multi-purpose two-way stakes 45 (each rotating, for example, just 45 degrees clockwise) sequentially squeeze all quick-lock-and-quick-release stake-clamping jaws 55a, 55b, 55c, and 55d to clamp on and lock all multi-purpose two-way stakes 45 in all quick-lock-and-quick-release stake-clamping jaw screws 43, in predetermined circular locations, respectively (FIG. 20).

All the above-mentioned components have the capabilities of sequentially locking all the components of the sewer-hose-supporting-and-protecting system together at predetermined locations to prevent the system from falling apart from impacts against, for example, people and animal.

Operation

To Assemble the Sewer-Hose-Supporting-and-Protecting System
(Referring to FIGS. 22, 23, 24, 25, and 26)

Inserting each end of sequential-locking pipes 46 into one of pipe-locking channels 47, 50a, and 50b, in the direction of arrow 65 such that each end is stopped and locked by one of pipe stoppers 48, 51a, and 51b, and all three pipe-locking nipples 60 on each end are locked in one of pipe-locking grooves 49, 52a, and 52b, to join sequential-locking pipes 46 together into a desired shape;

Screwing each quick-lock-and-quick-release stake-clamping jaw screw 43 in one quick-lock-and-quick-release jaw-squeezing chamber nut 44 (FIG. 26); and Inserting each multi-purpose two-way stake 45 through one quick-lock-and-quick-release stake-clamping jaw screw 43 (Each multi-purpose two-way stake 45 can move freely up and down without any friction through one quick-lock-and-quick-release stake-clamping jaw screw 43).

Figure 27A:
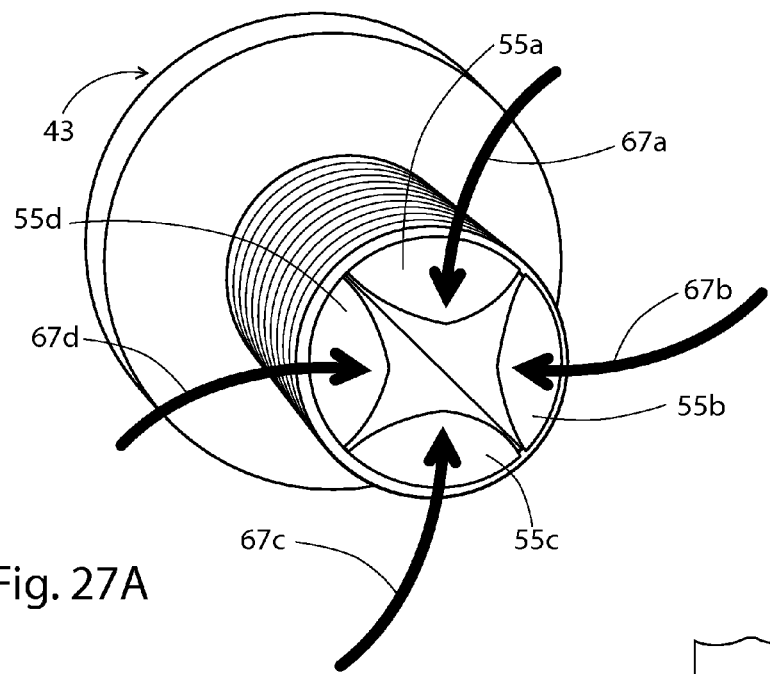
FIGS. 27A and 27B illustrate how to clamp the multi-purpose two-way stake with the quick-release stake-clamping jaws to lock it.
Figure 27B:
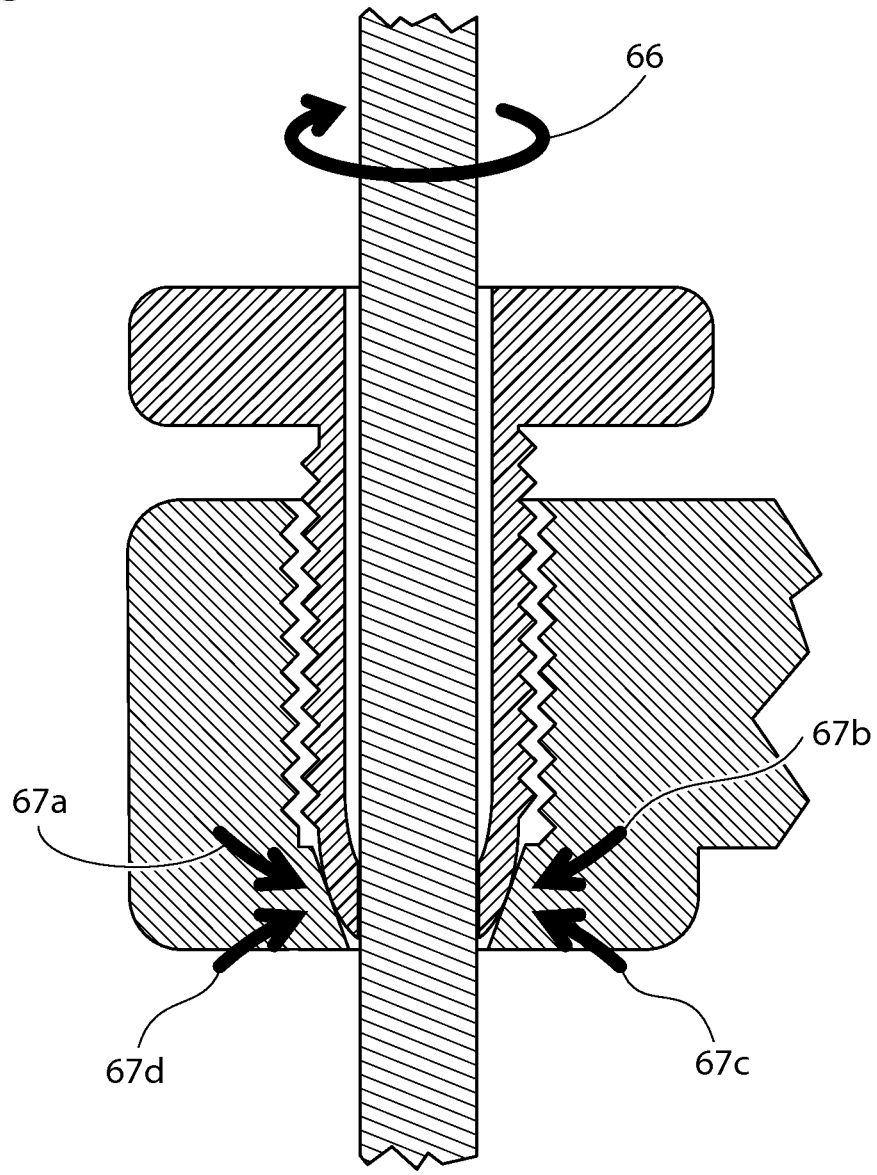

To Support a Sewer Hose with the Sewer-Hose-Supporting-and-Protecting System (Referring to FIGS. 27A and 27B)

Disposing a recreational-vehicle sewer hose inside sequential-locking end joints 41, sequential-locking middle joints 42, and sequential-locking pipes 46;

Adjusting each of sequential-locking end joints 41 and middle joints 42 to a desired height and angle; and Rotating each multi-purpose two-way stake 45 (for example, just 45 degrees clockwise) in the direction of arrow 66 (FIGS. 27A and 27B) to easily rotate one quick-lock-and-quick-release stake-clamping jaw screw 43 to squeeze its four quick-lock-and-quick-release stake-clamping jaws 55a, 55b, 55c, and 55d in the directions of arrows 67a, 67b, 67c, and 67d (FIGS. 27A and 27B) in quick-lock-and-quick-release jaw-squeezing chamber 57 of one quick-lock-and-quick-release jaw-squeezing chamber nut 44 to clamp on and lock each multi-purpose two-way stake 45 in one quick-lock-and-quick-release stake-clamping jaw screw 43.

Figure 28A:
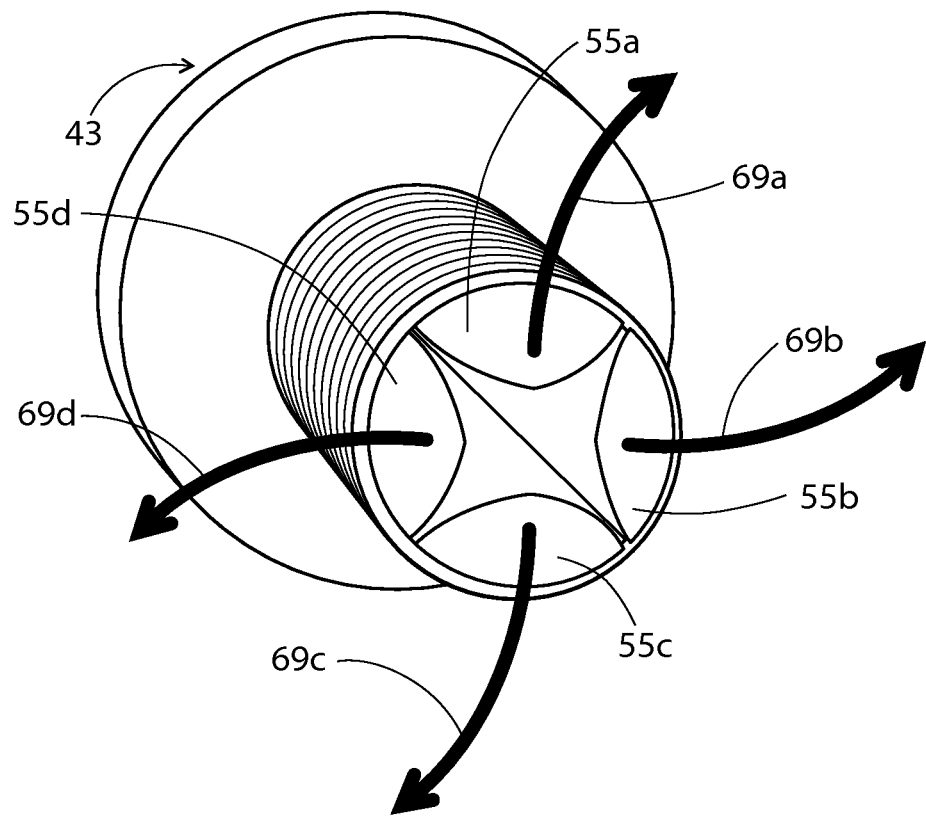
FIGS. 28A and 28B illustrate how to release the multi-purpose two-way stake from the quick-release stake-clamping jaws.
Figure 28B:
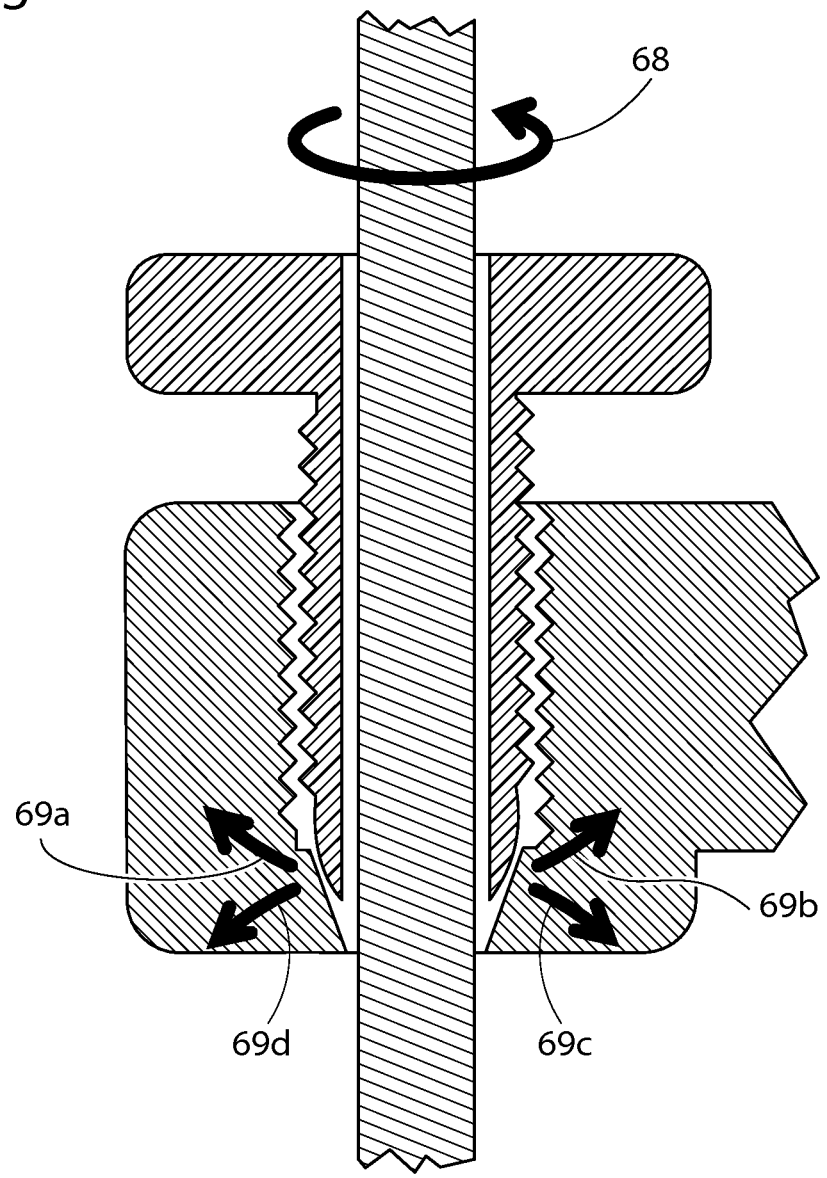

To Adjust the Height and Angle of the Sewer-Hose-Supporting-and-Protecting System (Referring to FIGS. 28A and 28B)

Rotating each multi-purpose two-way stake 45 (for example, just 45 degrees counterclockwise) in the direction of arrow 68 (FIGS. 28A and 28B) to easily rotate one quick-lock-and-quick-release stake-clamping jaw screw 43 to release its four quick-lock-and-quick-release stake-clamping jaws 55a, 55b, 55c, and 55d back to their original shape in the directions of arrows 69a, 69b, 69c, and 69d (FIGS. 28A and 28B) to release and allow each multi-purpose two-way stake 45 to move freely up and down without any friction through one quick-lock-and-quick-release stake-clamping jaw screw 43;

Adjusting each of sequential-locking end joints 41 and middle joints 42 to a desired height and angle; and Rotating each multi-purpose two-way stake 45 (for example, just 45 degrees clockwise) in the direction of arrow 66 (FIGS. 27A and 27B) to easily rotate one quick-lock-and-quick-release stake-clamping jaw screw 43 to squeeze its four quick-lock-and-quick-release stake-clamping jaws 55a, 55b, 55c, and 55d in the directions of arrows 67a, 67b, 67c, and 67d (FIGS. 27A and 27B) in quick-lock-and-quick-release jaw-squeezing chamber 57 of one quick-lock-and-quick-release jaw-squeezing chamber nut 44 to clamp on and lock each multi-purpose two-way stake 45 in one quick-lock-and-quick-release stake-clamping jaw screw 43.

To Disassemble the Sewer-Hose-Supporting-and-Protecting System (Referring to FIGS. 28A and 28B)

Rotating each multi-purpose two-way stake 45 (for example, just 45 degrees counterclockwise) in the direction of arrow 68 (FIGS. 28A and 28B) to easily rotate one quick-lock-and-quick-release stake-clamping jaw screw 43 to release its four quick-lock-and-quick-release stake-clamping jaws 55a, 55b, 55c, and 55d back to their original shape in the directions of arrows 69a, 69b, 69c, and 69d (FIGS. 28A and 28B) to release and allow each multi-purpose two-way stake 45 to move freely up and down without any friction through one quick-lock-and-quick-release stake-clamping jaw screw 43; and Taking apart the components of the sewer-hose-supporting-and-protecting system.

Unique Features and Functions

As a result, provided is the sewer-hose-supporting-and-protecting system:

1) Whose multi-purpose two-way stakes 45:
    Can be used right side up or upside down for supporting, stabilizing, and preventing the system from sinking into the ground;
    Can move freely up and down without any friction:
        a) To easily adjust the height of the system to eliminate the risk of personal injury
            (This capability overcomes the disadvantage of the prior art. The prior art uses frictional force and, therefore, prevents its respective stakes from moving freely up and down, requiring a large amount of physical effort to assemble, adjust, and disassemble the system, especially, when its stakes are rusted), and
        b) To easily assemble, adjust, and disassemble the system to extend the service lifespan of the system
            (This capability overcomes the disadvantage of the prior art. The prior art uses frictional force and, therefore, prevents its respective stakes from moving freely up and down, requiring a large amount of physical effort to assemble, adjust, and disassemble the system, especially, when its stakes are rusted);
    Can poke into the ground to maintain a desired shape of and to stabilize all the components of the system; and
    Only need to rotate just 45 degrees to quickly and easily lock or release the system at or from a desired height and angle, respectively.
2) whose pipe-locking nipples 60 sequentially lock sequential-locking pipes 46 to sequential-locking end joints 41 and middle joints 42, in pipe-locking grooves 49, 52a, and 52b, respectively.
3) whose quick-lock-and-quick-release stake-clamping jaws 55a, 55b, 55c, and 55d can quickly and easily lock or release the system at a desired height and angle, by simply rotating each multi-purpose two-way stake 45 just 45 degrees.
4) Whose components sequentially lock one another to withstand repetitive impacts while in use without falling apart.

Figure 29:
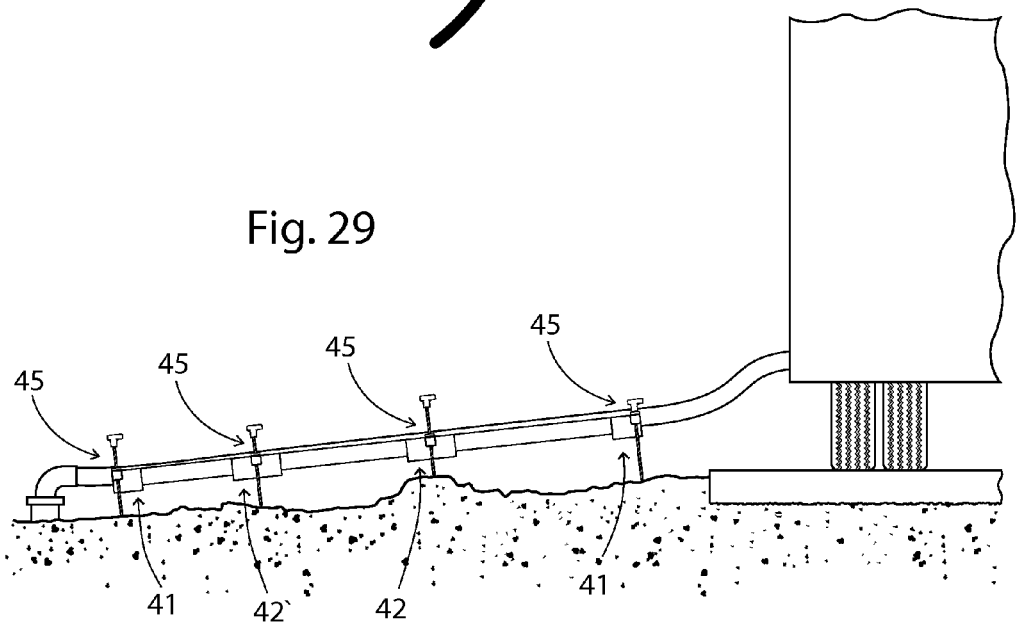
FIG. 29 illustrates how the sewer-hose-supporting-and-protecting system supports a recreational-vehicle sewer hose.

Therefore, the sewer-hose-supporting-and-protecting system is quick, easy, convenient, and safe to assemble, adjust, and disassemble for supporting and protecting a recreational-vehicle sewer hose, in a desired shape and at a desired height and angle (FIG. 29). As a result, the sewer-hose-supporting-and-protecting system overcomes all the disadvantages of the prior art.

Variations and Ramifications

FIG. 30 illustrates a variation of the sewer-hose-supporting-and-protecting system. All the components of the sewer-hose-supporting-and-protecting system can be used to both support and protect a recreational-vehicle sewer hose, in a predetermined shape and at a predetermined height and angle.

Any of sequential-locking end joints 41 and sequential-locking, middle joints 42 can be straight or curved at a predetermined angle and orientation to support and/or protect a recreational-vehicle sewer hose, in a predetermined shape and at a predetermined height and angle. For example, any of sequential-locking end joints 41 and sequential-locking middle joints 42 can curve 30 degrees, 45 degrees, 60 degrees, 90 degrees, or any degrees in between.

Any of sequential-locking pipes 46 can be straight or curved at a predetermined angle and orientation to support and/or protect a recreational-vehicle sewer hose, in a predetermined shape and at a predetermined height and angle. For example, any of sequential-locking pipes 46 can curve 30 degrees, 45 degrees, 60 degrees, 90 degrees, or any degrees in between.

The cross-section of each screw tunnel 54 and its mating multi-purpose two-way stake 45 can have any shape and size.

Each of quick-lock-and-quick-release stake-clamping jaws 55*a*, 55*b*, 55*c*, and 55*d* can have any shape and size, and can be integrated into its respective screw shaft 53 at any predetermined location and orientation thereon.

Each quick-lock-and-quick-release jaw-squeezing chamber 57 can have any shape and size, and can be integrated into its respective quick-lock-and-quick-release jaw-squeezing nut 44 at any predetermined location and orientation thereon.

Each stake foot-knob 58 can have any shape and size, and can be integrated into the body of its respective multi-purpose two-way stake 45 at any predetermined location and orientation thereon.

Each of pipe-locking nipples 60 can have any shape and size, and can be integrated into its respective sequential-locking pipe 46 at any predetermined location and orientation thereon.

Each component of the sewer-hose-supporting-and-protecting system can have any shape and size, and can be disposed at any location on the system, in respect to other components thereof, within the scope of the system.

CONCLUSION

An equivalent sewer-hose-supporting-and-protecting system, which is equivalent to and functions similarly to the sewer-hose-supporting-and-protecting system, can quickly and easily clamp on and release its multi-purpose two-way stakes with its quick-lock-and-quick-release stake-clamping jaws, by simply rotating its multi-purpose two-way stakes less than 45 degrees, FIG. 31 illustrates the sewer-hose-supporting-and-protecting system, using quick-lock-and-quick-release stake-clamping jaw screws 43 both right-side-up and upside-down, which can quickly clamp on and quickly release multi-purpose two-way stakes 45. As a result, a user can quickly and safely assemble, disassemble, and adjust the sewer-hose-supporting-and-protecting system, to support and protect a recreational-vehicle sewer hose.

Unique Advantages of the Present System Versus Prior-Art Disadvantages

The sewer-hose-supporting-and-protecting system overcomes all the disadvantages of the prior art heretofore. The sewer-hose-supporting-and-protecting system substantially departs from the conventional concepts and designs of the prior art. In doing so, the sewer-hose-supporting-and-protecting system provides many unique, significant advantages, some of which are, as follows:

1) It is an object of the present invention to provide a new recreational-vehicle sewer-hose-supporting-and-protecting system, which can be used right side up and/or upside down for multi purposes of supporting and protecting a recreational-vehicle sewer hose (This eliminates the problem of the prior art or their components not being able to be used upside down) (for example, U.S. Pat. No. 4,905,939 mentioned above).

2) It is another object of the present invention to provide a new recreational-vehicle sewer-hose-supporting-and-protecting system, whose quick-lock-and-quick-release stake-clamping jaws can quickly and easily lock and release the multi-purpose two-way stakes of the system, to eliminate the use of permanent frictional forces between stakes and nuts in the prior art every time a user assembles, adjusts, disassembles the system and the hose. As a result, this allows the stakes to move freely without any friction, and enables quick, easy, convenient, and safe assembly, adjustment, and disassembly of the system for different shape, height, and angle, to eliminate the risk of personal injuries, infections, and diseases (This eliminates the problem of personal injuries, infections, and diseases caused by the permanent frictional forces required at all times between the rusted stakes and nuts in the prior art) (for example, U.S. Pat. No. 5,431,455 mentioned above).

3) It is a further object of the present invention to provide a new recreational-vehicle sewer-hose-supporting-and-protecting system, whose quick-lock-and-quick-release stake-clamping jaws can quickly and easily lock and release the system at a desired height and angle, by simply rotating the multi-purpose two-way stakes of the system just 45 degrees, to eliminate the use of permanent frictional forces between stakes and nuts in the prior art every time a user adjusts the system and the hose to a desired height and angle. As a result, this allows the stakes to move freely without any friction, and enables quick, easy, convenient, and safe assembly, adjustment, and disassembly of the system for different shape, height, and angle (This eliminates the problem of personal injuries, infections, and diseases caused by the permanent frictional forces required at all times between the rusted stakes and nuts in the prior art).

4) It is an even further object of the present invention to provide a new recreational-vehicle sewer-hose-supporting-and-protecting system, whose multi-purpose two-way stakes:

Can be used right side up or upside down for multi purposes of supporting, stabilizing, and preventing the system from sinking into the ground;

Can move freely up and down without any friction:

a) To quickly and easily adjust the height of the system to eliminate the risk of personal injury (This capability overcomes the disadvantage of the prior art. The prior art uses frictional force and, therefore, prevents its respective stakes from moving freely up and down, creating the risk of personal injury, especially, when its stakes are rusted), and b) To quickly and easily assemble, adjust, and disassemble the system to extend the service lifespan of the system (This capability overcomes the disadvantage of the prior art. The prior art uses permanent frictional force and, therefore, prevents its respective stakes from moving freely up and down, requiring a large amount of physical effort to assemble, adjust, and disassemble the system, especially, when its stakes are rusted);

Can poke into the ground to maintain a desired shape of and to stabilize all the components of the system; and Only need to rotate just 45 degrees to quickly and easily lock or release the system at or from a desired height and angle, respectively.

(This eliminates the problem of the reliability and durability of the prior art, their components, or a recreational-vehicle sewer hose, which are damaged after a period of use).

5) It is still another object of the present invention to provide a new recreational-vehicle sewer-hose-supporting-and-protecting system, whose pipe-locking nipples and pipe-locking grooves sequentially lock sequential-locking end joints, sequential-locking middle joints, and sequential-locking pipes of the system together, to withstand repetitive impacts while in use, without falling apart (This eliminates the problem of the reliability and durability of the prior art, their components, or a recreational-vehicle sewer hose, which are sagging and falling apart after a period of use).

6) It is still a further object of the present invention to provide a new recreational-vehicle sewer-hose-supporting-and-protecting system, whose sequential-locking end joints, sequential-locking middle joints, and sequential-locking pipes can curve in any desired direction and angle for the system to form any desired shape while supporting and protecting a recreational-vehicle sewer hose (This eliminates the problem of the difficulty and inconvenience in assembling, adjusting, and disassembling the cumbersome, time-consuming, difficult-to-operate components of the prior art).

7) It is still an even further object of the present invention to provide a new recreational-vehicle sewer-hose-supporting-and-protecting system, whose sequential-locking end joints, sequential-locking middle joints, and sequential-locking pipes can securely function, both right side up and upside down, to support and protect a recreational-vehicle sewer hose, at the same time (This eliminates the problem of the reliability and durability of the prior art, their components, or a recreational-vehicle sewer hose, which are sagging and falling apart after a period of use).

8) It is still yet another object of the present invention to provide a new recreational-vehicle sewer-hose-supporting-and-protecting system, whose components sequentially lock one another to withstand repetitive impacts while in use, without sagging or falling apart (This eliminates the problem of the reliability and durability of the prior art, their components, or a recreational-vehicle sewer hose, which are sagging and falling apart after a period of use).

9) It is still yet a further object of the present invention to provide a new recreational-vehicle sewer-hose-supporting-and-protecting system, which will securely function both right side up and upside down, will not sag over a long distance, and thus will not eventually bend or break over extended periods of use (This eliminates the problem of the reliability and durability of the prior art, their components, or a recreational-vehicle sewer hose, which are sagging and falling apart after a period of use).

Therefore, the new recreational-vehicle sewer-hose-supporting-and-protecting system is quick, easy, convenient, and safe to assemble, adjust, and disassemble for supporting and protecting a recreational-vehicle sewer hose, in a desired shape and at a desired height and angle. As a result, the new recreational-vehicle sewer-hose-supporting-and-protecting system overcomes all the disadvantages of the prior art. These above and additional advantages are described and illustrated in the following examples and illustrations.

What is claimed is:

1. A stake-clamping-jaw and jaw-squeezing-chamber system for supporting and protecting a recreational-vehicle sewer hose, comprising a first semi-circular sequential-locking end joint, a second semi-circular sequential-locking end joint, a plurality of semi-circular sequential-locking middle joints, a plurality of stake-clamping jaw screws, a plurality of jaw-squeezing chamber nuts, a plurality of square-cross-section two-way stakes, and a plurality of semi-circular sequential-locking pipes, said first semi-circular sequential-locking end joint for releasably and sequentially locking one of said semi-circular sequential-locking pipes thereto, said first semi-circular sequential-locking end joint having a first semi-circular pipe-locking channel, a first straight pipe stopper, and a first semi-circular pipe-locking groove, said first semi-circular pipe-locking channel integrated into an end of said first semi-circular sequential-locking end joint, said first semi-circular pipe-locking channel for one of said semi-circular sequential-locking pipes to be inserted therein, said first straight pipe stopper integrated into an end of said first semi-circular pipe-locking channel, said first straight pipe stopper for releasably and sequentially locking one of said semi-circular sequential-locking pipes in said first semi-circular pipe-locking channel, said first semi-circular pipe-locking groove disposed along said first semi-circular pipe-locking channel, said first semi-circular pipe-locking groove extending the full length of and communicating with said first semi-circular pipe-locking channel, said first semi-circular pipe-locking groove for releasably and sequentially locking one of said semi-circular sequential-locking pipes in said first semi-circular pipe-locking channel, said second semi-circular sequential-locking end joint for releasably and sequentially locking one of said semi-circular sequential-locking pipes thereto, said second semi-circular sequential-locking end joint having a second semi-circular pipe-locking channel, a second straight pipe stopper, and a second semi-circular pipe-locking groove, said second semi-circular pipe-locking channel integrated into an end of said second semi-circular sequential-locking end joint, said second semi-circular pipe-locking channel for one of said semi-circular sequential-locking pipes to be inserted therein, said second straight pipe stopper integrated into an end of said second semi-circular pipe-locking channel, said second straight pipe stopper for releasably and sequentially locking one of said semi-circular sequential-locking pipes in said second semi-circular pipe-locking channel, said second semi-circular pipe-locking groove disposed along said second semi-circular pipe-locking channel, said second semi-circular pipe-locking groove extending the full length of and communicating with said second semi-circular pipe-locking channel, said second semi-circular pipe-locking groove for releasably and sequentially locking one of said semi-circular sequential-locking pipes in said second semi-circular pipe-locking channel, each of said semi-circular sequential-locking middle joints for releasably and sequentially locking two of said semi-circular sequential-locking pipes to each other, each of said semi-circular sequential-locking middle joints having two opposite semi-circular pipe-locking channels, two opposite straight pipe stoppers, and two opposite semi-circular pipe-locking grooves, each of said two opposite semi-circular pipe-locking channels integrated into an end of one of said semi-circular sequential-locking middle joints, each of said two opposite semi-circular pipe-locking channels for one of said semi-circular sequential-locking pipes to be inserted therein, each of said two opposite straight pipe stoppers integrated into an end of one of said two opposite semi-circular pipe-locking channels, each of said two opposite straight pipe stoppers for releasably and sequentially locking one of said semi-circular sequential-locking pipes in one of said two opposite semi-circular pipe-locking channels, each of said two opposite semi-circular pipe-locking grooves disposed along one of said two opposite semi-circular pipe-locking channels, each of said two opposite semi-circular pipe-locking grooves extending the full length of and communicating with one of said two opposite semi-circular pipe-locking channels, each of said two opposite semi-circular pipe-locking grooves for releasably and sequentially locking one of said semi-circular sequential-locking pipes in one of said two opposite semi-circular pipe-locking channels, each of said stake-clamping jaw screws for clamping on one of said square-cross-section two-way stakes to releasably and sequentially lock it when said stake-clamping jaw screw is rotated in one direction, and for releasing one of said square-cross-section two-way stakes to allow it to move without any friction when said stake-clamping jaw screw is rotated in another direction, each of said stake-clamping jaw screws screwed into one of said jaw-squeezing chamber nuts, each of said stake-clamping jaw screws having a threaded screw shaft, a square-cross-section screw tunnel, and a set of triangular stake-clamping jaws, said square-cross-section screw tunnel integrated into and extending the full length of said threaded screw shafts, said square-cross-section screw tunnel for one of said square-cross-section two-way stakes to be inserted therethrough, said triangular stake-clamping jaws integrated into an end of said threaded screw shaft, said triangular stake-clamping jaws for clamping on one of said square-cross-section two-way stakes to releasably and sequentially lock it when said triangular stake-clamping jaws are rotated in one direction, and for releasing one of said square-cross-section two-way stakes to allow it to move without any friction when said triangular stake-clamping jaws are rotated in another direction, each of said jaw-squeezing chamber nuts for squeezing a set of said triangular stake-clamping jaws when the set of said triangular stake-clamping jaws is rotated in one direction, and for releasing a set of said triangular stake-clamping jaws when the set of said triangular stake-clamping jaws is rotated in another direction, said jaw-squeezing chamber nuts integrated into the opposite sides of said first and second sequential-locking end joints and sequential-locking middle joints respectively, each of said jaw-squeezing chamber nuts having a nut bore and a frustum-shaped jaw-squeezing chamber, said nut bore threaded such that each of said jaw-squeezing chamber nuts is mated to one of said stake-clamping jaw screws, said frustum-shaped jaw-squeezing chamber integrated into an end of said nut bore, said frustum-shaped jaw-squeezing chamber for squeezing a set of said triangular stake-clamping jaws such that the set of said triangular stake-clamping jaws will clamp on one of said square-cross-section two-way stakes, and for releasing a set of said triangular stake-clamping jaws such that the set of said triangular stake-clamping jaws will release one of said square-cross-section two-way stakes, each of said square-cross-section two-way stakes for rotating one of said stake-clamping jaw screws in one direction to squeeze a set of said triangular stake-clamping jaws to clamp on one of said square-cross-section two-way stakes, and for rotating one of said stake-clamping jaw screws in another direction to release a set of said triangular stake-clamping jaws to release one of said square-cross-section two-way stakes, each of said square-cross-section two-way stakes having a first stake end, a second stake end, and a stake foot-knob molded on said first stake end, said stake foot-knobs for being used upside down as feet to prevent said square-cross-section two-way stakes from sinking into the ground to stabilize the stake-clamping-jaw and jaw-squeezing-chamber system, and for being used right side up as knobs to rotate said square-cross-section two-way stakes, each of said square-cross-section two-way stakes mated to and able to move without any friction through one of said square-cross-section screw tunnels, and said semi-circular sequential-locking pipes for supporting and protecting a recreational-vehicle sewer hose, each of said semi-circular sequential-locking pipes having two opposite sets of pipe-locking nipples, each opposite set of said pipe-locking nipples integrated into an end of one of said semi-circular sequential-locking pipes, each opposite set of said pipe-locking nipples for being inserted into one of said first, second, and opposite semi-circular pipe-locking grooves to releasably and sequentially lock one of said semi-circular sequential-locking pipes to one of said first and second sequential-locking end joints and sequential-locking middle joints, whereby the stake-clamping-jaw and jaw-squeezing-chamber system using predetermined clamping and releasing methods to be assembled, disassembled, and adjusted for supporting and protecting a recreational-vehicle sewer hose is provided, and is able to clamp on said square-cross-section two-way stakes to releasably and sequentially lock said square-cross-section two-way stakes, is able to release said square-cross-section two-way stakes to allow said square-cross-section two-way stakes to move without any friction to eliminate permanent frictional forces between said stakes and said screws, is able to be assembled, is able to be disassembled, is able to allow a user to adjust the height and shape of the system, is able to be used right side up or upside down, is able to be releasably and sequentially locked to support and protect a recreational-vehicle sewer hose without sagging or falling apart.

2. The stake-clamping-jaw and jaw-squeezing-chamber system of claim 1, wherein, each of said stake foot-knobs having a triangular shape.

3. The stake-clamping-jaw and jaw-squeezing-chamber system of claim 2, wherein, each of said square-cross-section two-way stakes is capable of being rotated 45 degrees or less clockwise to be releasably and sequentially clamped on and locked by said triangular stake-clamping jaws.

4. The stake-clamping-jaw and jaw-squeezing-chamber system of claim 2, wherein, each of said square-cross-section two-way stakes is capable of being rotated 45 degrees or less counter-clockwise to be released from said triangular stake-clamping jaws.

5. The stake-clamping-jaw and jaw-squeezing-chamber system of claim 1, wherein, at least one of said semi-circular sequential-locking pipes being curved.

6. The stake-clamping-jaw and jaw-squeezing-chamber system of claim 1, wherein, at least one of said semi-circular sequential-locking pipes being straight.

7. The stake-clamping-jaw and jaw-squeezing-chamber system of claim 1, wherein, said semi-circular sequential-locking pipes are made of metallic material.

8. The stake-clamping-jaw and jaw-squeezing-chamber system of claim 1, wherein, said semi-circular sequential-locking pipes are made of plasticized material.

9. The stake-clamping-jaw and jaw-squeezing-chamber system of claim 1, wherein, said triangular stake-clamping jaws are made from one of a resilient or semi-resilient material.

10. The stake-clamping-jaw and jaw-squeezing-chamber system of claim 1, wherein, said first and said second semi-circular sequential-locking end joints and said semi-circular sequential-locking middle joints are made of metallic material.

11. The stake-clamping-jaw and jaw-squeezing-chamber system of claim 1, wherein, said first and said second semi-circular sequential-locking end joints and said semi-circular sequential-locking middle joints are made of plasticized material.

12. The stake-clamping-jaw and jaw-squeezing-chamber system of claim 1, wherein, said stake-clamping jaw screws and said jaw-squeezing chamber nuts are made of metallic material.

13. The stake-clamping-jaw and jaw-squeezing-chamber system of claim 1, wherein, said stake-clamping jaw screws and said jaw-squeezing chamber nuts are made of plasticized material.

14. The stake-clamping-jaw and jaw-squeezing-chamber system of claim 1, wherein, each of said second stake ends being pointed for being inserted into the ground to attach the stake-clamping-jaw and jaw-squeezing-chamber system thereto.

15. A stake-clamping-jaw and jaw-squeezing-chamber system for supporting and protecting a recreational-vehicle sewer hose, comprising a first sequential-locking end joint, a second sequential-locking end joint, a plurality of sequential-locking middle joints, a plurality of stake-clamping jaw screws, a plurality of jaw-squeezing chamber nuts, a plurality of square-cross-section two-way stakes, and a plurality of sequential-locking pipes, said first sequential-locking end joint having a first pipe-locking channel, a first pipe stopper, and a first pipe-locking groove, said first pipe-locking channel integrated into an end of said first sequential-locking end joint, said first pipe-locking channel for one of said sequential-locking pipes to be inserted therein, said first pipe stopper integrated into an end of said first pipe-locking channel, said first pipe stopper for releasably and sequentially locking one of said sequential-locking pipes in said first pipe-locking channel, said first pipe-locking groove disposed along said first semi-circular pipe-locking channel, said first pipe-locking groove extending the full length of and communicating with said first pipe-locking channel, said first pipe-locking groove for releasably and sequentially locking one of said sequential-locking pipes in said first pipe-locking channel, said first sequential-locking end joint for releasably and sequentially locking one of said sequential-locking pipes thereto, said second sequential-locking end joint having a second pipe-locking channel, a second pipe stopper, and a second pipe-locking groove, said second pipe-locking channel integrated into an end of said second sequential-locking end joint, said second pipe-locking channel for one of said sequential-locking pipes to be inserted therein, said second pipe stopper integrated into an end of said second pipe-locking channel, said second pipe stopper for releasably and sequentially locking one of said sequential-locking pipes in said second pipe-locking channel, said second pipe-locking groove disposed along said second pipe-locking channel, said second pipe-locking groove extending the full length of and communicating with said second pipe-locking channel, said second pipe-locking groove for releasably and sequentially locking one of said sequential-locking pipes in said second pipe-locking channel, said second semi-circular sequential-locking end joint for releasably and sequentially locking one of said sequential-locking pipes thereto, each of said sequential-locking middle joints having two opposite semi-circular pipe-locking channels, two opposite pipe stoppers, and two opposite pipe-locking grooves, each of said two opposite pipe-locking channels integrated into an end of one of said sequential-locking middle joints, each of said two opposite pipe-locking channels for one of said sequential-locking pipes to be inserted therein, each of said two opposite pipe stoppers integrated into an end of one of said two opposite semi-circular pipe-locking channels, each of said two opposite pipe stoppers for releasably and sequentially locking one of said sequential-locking pipes in one of said two opposite pipe-locking channels, each of said two opposite pipe-locking grooves disposed along one of said two opposite pipe-locking channels, each of said two opposite pipe-locking grooves extending the full length of and communicating with one of said two opposite pipe-locking channels, each of said two opposite pipe-locking grooves for releasably and sequentially locking one of said sequential-locking pipes in one of said two opposite pipe-locking channels, each of said sequential-locking middle joints for releasably and sequentially locking two of said sequential-locking pipes to each other, each of said stake-clamping jaw screws having a threaded screw shaft, a square-cross-section screw tunnel, and a set of triangular stake-clamping jaws, said square-cross-section screw tunnel integrated into and extending the full length of said threaded screw shafts, said square-cross-section screw tunnel for one of said square-cross-section two-way stakes to be inserted therethrough, said triangular stake-clamping jaws integrated into an end of said threaded screw shaft, said triangular stake-clamping jaws for clamping on one of said square-cross-section two-way stakes to releasably and sequentially lock it when said triangular stake-clamping jaws are rotated in one direction, and for releasing one of said square-cross-section two-way stakes to allow it to move without any friction when said triangular stake-clamping jaws are rotated in another direction, each of said stake-clamping jaw screws screwed into one of said jaw-squeezing chamber nuts, each of said stake-clamping jaw screws for clamping on one of said square-cross-section two-way stakes to releasably and sequentially lock it when said stake-clamping jaw screw is rotated in one direction, and for releasing one of said square-cross-section two-way stakes to allow it to move without any friction when said stake-clamping jaw screw is rotated in another direction, each of said jaw-squeezing chamber nuts having a nut bore and a frustum-shaped jaw-squeezing chamber, said nut bore threaded such that each of said jaw-squeezing chamber nuts is mated to one of said stake-clamping jaw screws, said frustum-shaped jaw-squeezing chamber integrated into an end of said nut bore, said frustum-shaped jaw-squeezing chamber for squeezing a set of said triangular stake-clamping jaws such that the set of said triangular stake-clamping jaws will clamp on one of said square-cross-section two-way stakes, and for releasing a set of said triangular stake-clamping jaws such that the set of said triangular stake-clamping jaws will release one of said square-cross-section two-way stakes, said jaw-squeezing chamber nuts integrated into the opposite sides of said first and second sequential-locking end joints and sequential-locking middle joints respectively, each of said jaw-squeezing chamber nuts for squeezing a set of said triangular stake-clamping jaws when the set of said triangular stake-clamping jaws is rotated in one direction, and for releasing a set of said triangular stake-clamping jaws when the set of said triangular stake-clamping jaws is rotated in another direction, each of said square-cross-section two-way stakes having a first stake end, a second stake end, and a stake foot-knob molded on said first stake end, said stake foot-knobs for being used upside down as feet to prevent said square-cross-section two-way stakes from sinking into the ground to stabilize the stake-clamping-jaw and jaw-squeezing-chamber system, and for being used right side up as knobs to rotate said square-cross-section two-way stakes, each of said square-cross-section two-way stakes mated to and able to move without any friction through one of said square-cross-section screw tunnels, each of said square-cross-section two-way stakes for rotating one of said stake-clamping jaw screws in one direction to squeeze a set of said triangular stake-clamping jaws to clamp on one of said square-cross-section two-way stakes, and for rotating one of said stake-clamping jaw screws in another direction to release a set of said triangular stake-clamping jaws to release one of said square-cross-section two-way stakes, and each of said sequential-locking pipes having two opposite sets of pipe-locking nipples, each opposite set of said pipe-locking nipples integrated into an end of one of said sequential-locking pipes, each opposite set of said pipe-locking nipples for being inserted into one of said first, second, and opposite semi-circular pipe-locking grooves to releasably and sequentially lock one of said semi-circular sequential-locking pipes to one of said first and second sequential-locking end joints and sequential-locking middle joints, said sequential-locking pipes for supporting and protecting a recreational-vehicle sewer hose, whereby the stake-clamping-jaw and jaw-squeezing-chamber system using predetermined clamping and releasing methods to be assembled, disassembled, and adjusted for supporting and protecting a recreational-vehicle sewer hose is provided, and is able to clamp on said square-cross-section two-way stakes to releasably and sequentially lock said square-cross-section two-way stakes, is able to release said square-cross-section two-way stakes to allow said square-cross-section two-way stakes to move without any friction to eliminate permanent frictional forces between said stakes and said screws, is able to be assembled, is able to be disassembled, is able to allow a user to adjust the height and shape of the system, is able to be used right side up or upside down, is able to be releasably and sequentially locked to support and protect a recreational-vehicle sewer hose without sagging or falling apart.

16. The stake-clamping-jaw and jaw-squeezing-chamber system of claim 15, wherein, each of said stake foot-knobs having a triangular shape.

17. The stake-clamping-jaw and jaw-squeezing-chamber system of claim 15, wherein, each of said square-cross-section two-way stakes is capable of being rotated 45 degrees or less clockwise to be releasably and sequentially clamped on and locked by said triangular stake-clamping jaws.

18. The stake-clamping-jaw and jaw-squeezing-chamber system of claim 15, wherein, each of said square-cross-section two-way stakes is capable of being rotated 45 degrees or less counter-clockwise to be released from said triangular stake-clamping jaws.

19. The stake-clamping-jaw and jaw-squeezing-chamber system of claim 15, wherein, at least one of said sequential-locking pipes being curved.

20. The stake-clamping-jaw and jaw-squeezing-chamber system of claim 15, wherein, at least one of said sequential-locking pipes being straight.

\* \* \* \* \*